United States Patent
Davis et al.

(10) Patent No.: US 12,299,623 B2
(45) Date of Patent: May 13, 2025

(54) SMART MANUFACTURING PLATFORM, SMART MANUFACTURING PROFILES AND SMART MANUFACTURING MARKETPLACE

(71) Applicant: The Regents of the University of California, Oakland, CA (US)

(72) Inventors: James F. Davis, Los Angeles, CA (US); John Dyck, Newbury, OH (US); Haresh Malkani, Pittsburgh, PA (US); Prakashan P. Korambath, Calabasas, CA (US); Jonathan Wise, Chardon, OH (US)

(73) Assignee: The Regents of the University of California, Oakland, CA (US)

( * ) Notice: Subject to any disclaimer, the term of this patent is extended or adjusted under 35 U.S.C. 154(b) by 30 days.

(21) Appl. No.: 17/753,114

(22) PCT Filed: Aug. 21, 2020

(86) PCT No.: PCT/US2020/047474
§ 371 (c)(1),
(2) Date: Feb. 18, 2022

(87) PCT Pub. No.: WO2021/035171
PCT Pub. Date: Feb. 25, 2021

(65) Prior Publication Data
US 2022/0245538 A1    Aug. 4, 2022

Related U.S. Application Data

(60) Provisional application No. 62/890,016, filed on Aug. 21, 2019.

(51) Int. Cl.
*G06Q 10/067* (2023.01)
*G06Q 50/04* (2012.01)

(52) U.S. Cl.
CPC ......... *G06Q 10/067* (2013.01); *G06Q 50/04* (2013.01)

(58) Field of Classification Search
CPC .... G06Q 10/067; G06Q 50/04; G06Q 10/063; G05B 2219/31282; G05B 19/4183
See application file for complete search history.

(56) References Cited

U.S. PATENT DOCUMENTS 7,853,922 B1 * 12/2010 Szpak ............... G06F 8/35
717/106
8,688,878 B1    4/2014 Dolan et al.
(Continued)

FOREIGN PATENT DOCUMENTS

EP    1986143 A1    10/2008
EP    4018299 A2    6/2022
(Continued)

OTHER PUBLICATIONS

Architecture Based Approach to the Control Software Design S. Banks, N. Coleman, G. Papanagopoulos, M. DeVito , C.F.Lin (Year: 1994).*

(Continued)

*Primary Examiner* — Alexandru Cirnu
(74) *Attorney, Agent, or Firm* — KPPB LLP

(57) ABSTRACT

Data centric smart manufacturing systems are described. In an embodiment, the data centric smart manufacturing system includes several systems providing raw data, several reusable data model profiles that ingest the raw data and contextualize the raw data, where a data model profile defines contextualized data, configurations, and data connectivity protocols for a particular type of system, and several data transformation models integrated with the data model profiles and instantiated with contextualized data to provide higher level operational insights.

19 Claims, 18 Drawing Sheets

(56) References Cited

U.S. PATENT DOCUMENTS

| | | | | |
|---|---|---|---|---|
| 2008/0114474 | A1* | 5/2008 | Campbell | G05B 19/4183 700/89 |
| 2014/0068448 | A1* | 3/2014 | Plost | G06F 3/0481 715/738 |
| 2015/0341230 | A1 | 11/2015 | Dave et al. | |
| 2016/0019504 | A1* | 1/2016 | Ghosh | G06Q 10/0633 705/7.23 |
| 2017/0351226 | A1* | 12/2017 | Bliss | G05B 19/4063 |
| 2019/0236149 | A1 | 8/2019 | Kuruvada et al. | |
| 2020/0265379 | A1* | 8/2020 | Walker | G06N 20/00 |
| 2020/0286025 | A1* | 9/2020 | Ramchandran | G06N 5/046 |
| 2021/0341905 | A1* | 11/2021 | Chand | G05B 19/4155 |

FOREIGN PATENT DOCUMENTS

| | | |
|---|---|---|
| WO | 2021035171 A2 | 2/2021 |
| WO | 2021035171 A3 | 3/2021 |
| WO | 2021035171 A8 | 12/2022 |

OTHER PUBLICATIONS

International Preliminary Report on Patentability for International Application PCT/US2020/047474, Report issued Feb. 17, 2022, Mailed on Mar. 3, 2022, 08 Pgs.

International Search Report and Written Opinion for International Application No. PCT/US2020/047474, Search completed Jan. 4, 2021, Mailed Feb. 5, 2021, 18 Pgs.

Aguirre, "Computational Fluid Dynamics Modeling and Simulation of Steam Methane Reforming Reactors and Furnaces", University of California Los Angeles, Doctor of Philosophy Dissertation, 2017, 222 pgs.

Edgar et al., "Industrial Scale Demonstration of Smart Manufacturing, Achieving Transformational Energy Productivity Gains", USDOE Office of Energy Efficiency and Renewable Energy (EERE), DOE Report Award No. DE-EE0005763, Feb. 26, 2018, 131 pgs. (presented in two parts).

Griffor et al., "Framework for Cyber-Physical Systems: vol. 1, Overview", National Institute of Standards and Technology, U.S. Department of Commerce, NIST Special Publication 1500-201, Version 1.0, Jun. 2017, 79 pgs. (presented in two parts).

Korambath et al., "A smart manufacturing use case: furnace temperature balancing in a steam methane reforming process via Kepler workflows", Procedia Computer Science, vol. 80, 2016, pp. 680-689.

Korambath et al., "Deploying Kepler Workflows as Services on a Cloud Infrastructure for Smart Manufacturing", Procedia Computer Science, vol. 29, 2014, pp. 2254-2259.

Korambath et al., "Use of On-Demand Cloud Services to Model the Optimization of an Austenitization Furnace", Smart and Sustainable Manufacturing Systems, vol. 2, No. 1, Nov. 13, 2018, pp. 165-179.

Kumar et al., "Smart manufacturing approach for efficient operation of industrial steam-methane reformers", Industrial & Engineering Chemical Research, vol. 54, No. 16, 2015, pp. 4360-4370.

Mell et al., "The NIST Definition of Cloud Computing", National Institute of Standards and Technology, U.S. Department of Commerce, Special Publication 800-145, Sep. 2011, 7 pgs.

Thoben et al., "Industrie 4.0' and Smart Manufacturing—A Review of Research Issues and Application Examples", International Journal of Automation Technology, vol. 11, No. 1, pp. 4-19.

Extended European Search Report for European Application No. 20854157.3, Search completed Aug. 8, 2023, Mailed Aug. 17, 2023, 8 Pgs.

Davis et al., "Smart Manufacturing", Annual Review of Chemical and Biomolecular Engineering, vol. 6, No. 1, 2015, pp. 141-160, doi: 10.1146/annurev-chembioeng-061114-123255.

Davis et al., "Smart manufacturing, manufacturing intelligence and demand-dynamic performance", Computers & Chemical Engineering, vol. 47, Dec. 20, 2012, pp. 145-156, https://doi.org/10.1016/j.compchemeng.2012.06.037.

Pantoleontos et al., "A heterogeneous dynamic model for the simulation and optimisation of the steam methane reforming reactor", International Journal of Hydrogen Energy, vol. 37, No. 21, Nov. 2012, available online Mar. 19, 2012, pp. 16346-16358, https://doi.org/10.1016/j.ijhydene.2012.02.125.

Tran et al., "Steam methane reforming furnace temperature balancing via CFD model-based optimization", IEEE, 2017 American Control Conference (ACC), May 24-26, 2017, pp. 4165-4170.

\* cited by examiner

*FIG. 9a*

SMART MANUFACTURING PLATFORM, SMART MANUFACTURING PROFILES AND SMART MANUFACTURING MARKETPLACE

CROSS-REFERENCED APPLICATIONS

This application is a national stage of PCT Patent Application No. PCT/US2020/047474 entitled "Smart Manufacturing Platform, Smart Manufacturing Profiles and Smart Manufacturing Marketplace" to Davis et al., filed Aug. 21, 2020, which claims priority to U.S. Provisional application No. 62/890,016 filed on Aug. 21, 2019, entitled "Systems and Methods for Data Centric Smart Manufacturing", the disclosure of which is included herein by reference in its entirety.

STATEMENT OF FEDERALLY SPONSORED RESEARCH

This invention was made with government support under DE-EE0005763, and DE-EE0007613 awarded by the U.S. Department of Energy, 70NANB12H219 awarded by the National Institute of Standards and Technology, and 1321470 awarded by the National Science Foundation. The government has certain rights in the invention.

FIELD OF THE INVENTION

The present invention generally relates to smart manufacturing systems, in particular to data centric modeling, configuration, and transformation of manufacturing processes and machines to provide reusability for software applications.

SUMMARY OF THE INVENTION

Smart manufacturing systems in accordance with many embodiments of the invention are illustrated. In an embodiment, a data centric smart manufacturing system, includes: several systems providing raw data, several reusable data model profiles that ingest the raw data and contextualize the raw data, where a data model profile defines contextualized data, configurations, and data connectivity protocols for a particular type of system from the plurality of systems, and several data transformation models integrated with the several data model profiles and instantiated with contextualized data to provide higher level operational insights, where at least one data model profile includes a combined pre-defined base data model profile and a user defined data model profile that inherits the base data model profile and extends the based data model profile to define parameters of the base data model profile.

In a further embodiment, a system is at least one of a sensor, a robot, a device, a component, a machine, a collection of machines, and a manufacturing plant.

In a further embodiment again, a data model profile is extended upon to define transformations to the raw data generated by the plurality of systems to create specific input data to a data store.

In still a further embodiment, the data store is accessible to at least one application, where the at least one application generates configuration parameters to control the operation of a particular system based upon data obtained across a set of systems utilized within a manufacturing process.

In still a further embodiment again, the at least one application analyzes different data obtained from a plurality of different systems manufactured by different vendors.

In still a further embodiment again, the at least one application uses a data model profile to obtain data from at least one system.

In still a further embodiment again, the at least one application uses a plurality of data model profiles to access data from a plurality of different systems.

In still a further embodiment again, the data store stores the raw data as contextualized XML data.

In still a further embodiment again, a data model profile is defined for at least one of a sensor, a device, and a system.

In still a further embodiment again, a data model profile is defined for a particular vendor.

In still a further embodiment again, a first data model profile is defined for a first vendor and a second data model profile is defined for a second different vendor.

In still a further embodiment again, a third data model profile is defined that inherits properties from the first data model profile and the second data model profile.

In still a further embodiment again, a first data model profile comprises a first set of attributes and a first set of functions for a system.

In still a further embodiment again, a second data model profile inherits the first set of attributes and the first set of functions from the first data model profile and comprises a second set of attributes and a second set of functions.

In still a further embodiment again, different data model profiles are defined for different vendors.

In still a further embodiment again, at least one data model profile includes several data ingestion protocols for ingesting raw data from several different vendor systems.

In still a further embodiment again, the several systems are from different vendors.

In still a further embodiment again, a data model profile defines a vendor-agnostic set of attributes and a set of functions for a system.

In still a further embodiment again, a system data model profile is defined for a plurality of devices.

BRIEF DESCRIPTION OF THE DRAWINGS

FIG. 9a illustrates a base SM Profile in accordance with an embodiment of the invention.

DETAILED DESCRIPTION OF THE DRAWINGS

Figure 1:
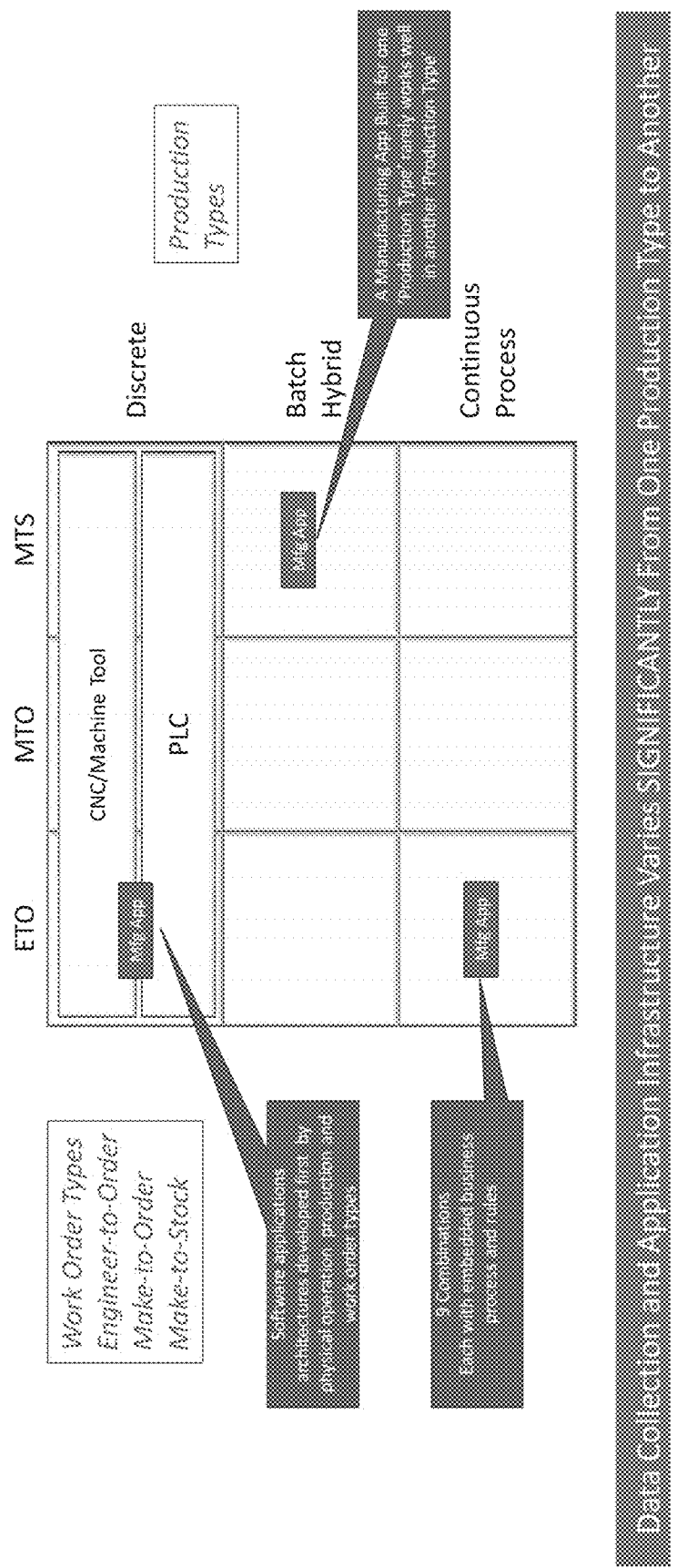
FIG. 1 legacy software application siloes.

Turning now to the drawings, data centric smart manufacturing systems in accordance with various embodiments of the invention are illustrated. In particular, many embodiments allow for the reusability of engineering knowhow using various data modeling templates for machine controls and processes with a data centric approach to smart manufacturing that provides a platform upon which different software applications can be built. Smart manufacturing describes the process of taking an inventory of raw inputs, such as materials or components, and the transformations applied to the raw inputs using one or more machines to produce a finished product using real time operations data. Smart manufacturing generally employs computer-integrated manufacturing with high levels of adaptability.

A manufacturing process may utilize a collection of machines, each machine having a collection of devices and each device having various sensors, drivers, robots, among other components. Most of the processes, machines and/or sensor systems used during the manufacturing process, together described herein as machines, used in smart manufacturing typically have various controllable operating parameters as well different sensors that provide raw information about the operation of the machine and/or the intermediate assembly or product being worked upon or produced by the machine. As such, different machines may utilize different protocols, rely on different software applications (e.g., vendor implemented software) and output data in different formats. Accordingly, in order to provide for the seamless integration of different machines for use by different software applications, many embodiments of the data centric smart manufacturing system provide a data centric platform using templatized data models that enables for the monitoring and control of machines as part of a coordinated manufacturing process.

Accordingly, many embodiments define a variety of manufacturing profiles, also referred to as Smart Manufacturing (SM) profiles, to provide templates for the information available from a machine, and the corresponding sensor system, and the manner in which the machine can be controlled. In particular, in many embodiments, the SM profiles provide the interfaces for capturing raw data from the machines and generating higher level contextualization of the raw data for storing in a data store. In some embodiments, the contextualized data may include metadata that provides any of a number of additional information with respect to the raw data for use by software applications. The additional information provided within an SM Profile may include a variety of different attributes of a machine, including attributes that describe the form (e.g., dimensions, shape, among others), operation, behavior, and performance of the machine.

Accordingly, many embodiments of the data centric smart manufacturing system provide a platform over the contextualized data upon which different software applications can be built while providing software interoperability through the utilization of the templatized SM Profiles. In this data centric view, the raw data generated by different machines can be utilized by different software applications in operational context to actuate physical operations and control different aspects of the manufacturing process.

In many embodiments, an SM Profile can also be extended upon to define transformations to the sensor data outputs generated by the machines to create specific input data to the data store that is then accessible to a variety of applications as a common set of data with respect to a set of machines that are cooperating as part of the manufacturing process. These applications can then generate configuration parameters to control the operation of individual machines based upon data obtained across a set of machines utilized within the manufacturing process. For example, in many embodiments, an SM Profile (e.g., Profile A) can be extended whereby the extended profile (e.g., Profile B) can inherit properties of a base profile. The extended profile, Profile B, can define how to populate data points of the base profile. Furthermore, a further profile (e.g. Profile C) can be defined that extends the combined profile (e.g., Profile A and Profile B) with a workflow where a data transformation model can be called to perform a computation against the data identified and gathered as profiles A and B are executed. Accordingly, in many embodiments, each SM Profile can define the contextualized data, model configurations, data connectivity protocols, and functions and/or operations for a machine and/or sensor system in a declarative template that may be reusable for other applications with similar design parameters.

Furthermore, many embodiments provide integration that can be used to describe how data transformation models are integrated with the SM profiles and configurations instantiated with contextualized data to meet an individual data transformation objective. Integration can also be used at an application level to describe how multiple data transformation, time and human centered and automated execution come together into a manufacturing application built upon the data centric smart manufacturing platform.

Accordingly, in many embodiments, the contextualized data is usable after appropriate data transformation with higher level activities such as analytics, monitoring, diagnosis, among various other activities that can provide higher level operational insights. In certain embodiments, at a highest level of operational execution, data, information, and transformations can be further contextualized and integrated together for optimization, prediction, and automated and user-involved actions that can drive high-level operational and non-operational (e.g., business decision making, forecasting, among others) activities. Accordingly, many embodiments of the data centric smart manufacturing system includes not only the machine and sensor systems that produce and use data, but also the necessary instantiation, integration, and execution of any or all levels of data-driven action throughout a manufacturing process. As described in detail the data centric smart manufacturing platform can be utilized for any of a variety of manufacturing processes and the SM profiles and data transformation models can be modified as appropriate to the requirements of specific applications in accordance with embodiments of the invention.

FIG. 1 illustrates legacy software application siloes, and illustrates the underpinning of technical complexity with software applications in manufacturing operations. As shown in FIG. 1, software products tend to be developed specifically for production and work order combinations forming nine largely isolated software product cells based on discrete, continuous and batch production types and engineer-to-order, made-to-order and made-to-stock work order modes. Software products have tended to lock down architecturally first on physical assets, processes and production/work order functions. Operational data functions are then embedded and the information technology and hardware/software requirements are developed specific to the vendor product, production types, work order types and industry. It can be very difficult for software applications to be reused for other production/work order applications. It can be also very difficult for embedded information and operational data technologies to be reused for other applications. It is not only difficult but counter to market drivers to integrate across vendor products. The result of these legacy 'silos' is a huge proliferation of independently built software applications that offer little reusability. Each comes with its own infrastructure and each requires a great deal of individual integration and maintenance.

Figure 2:
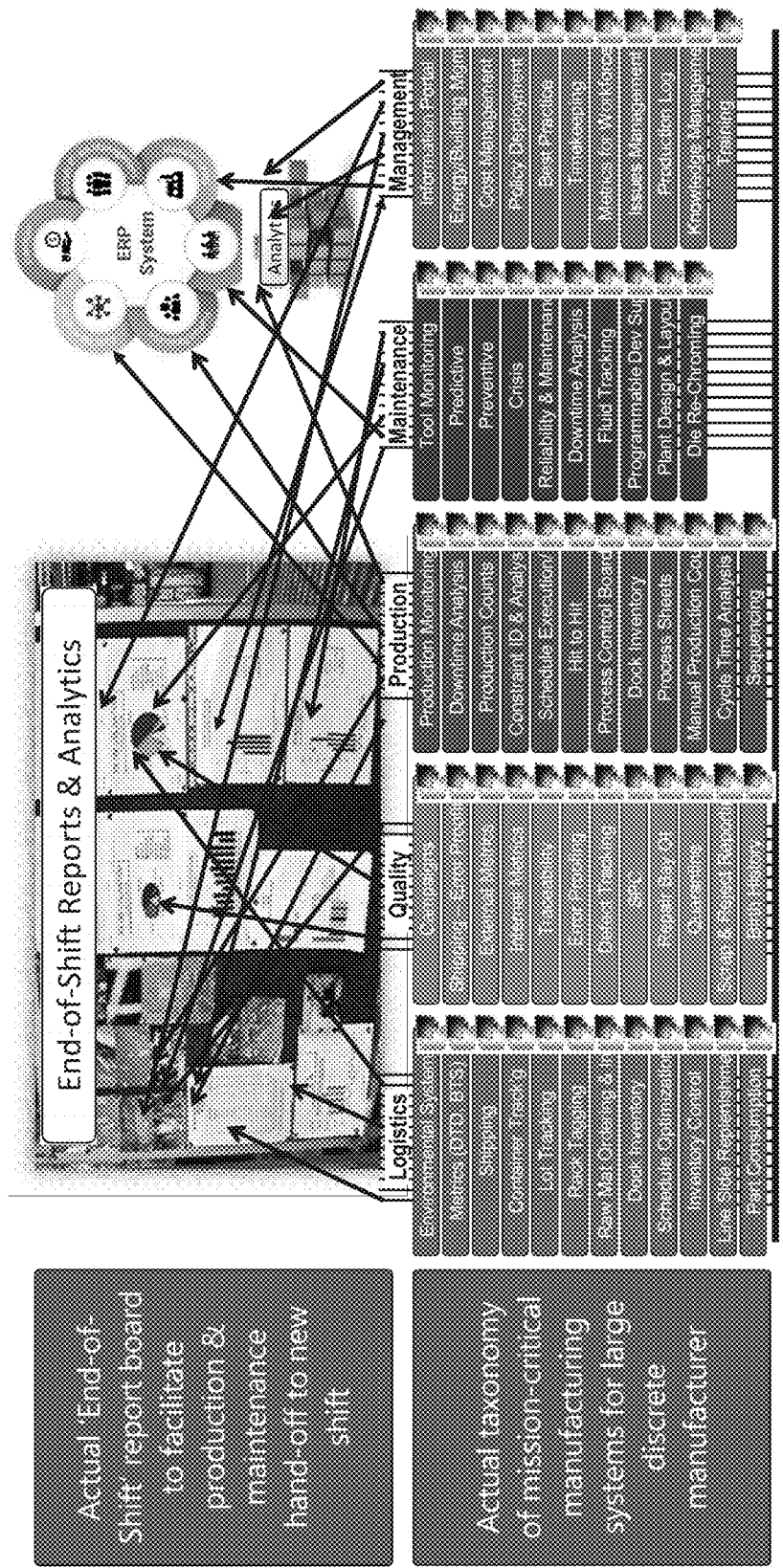
FIG. 2 illustrates the complexity of legacy siloes for digitalization.

Likewise FIG. 2 illustrates the complexity of legacy siloes for digitalization. As manufacturers push for more contextualization, information, insights and smart applications, the ensuing complexity is revealed as shown in FIG. 2. Pictured are the data interconnections from an actual taxonomy of mission critical manufacturing systems required to produce an end-of-shift report. Each individual system (each colored box)—generally from different vendors, requires an estimated 1,000 configuration and parameter settings to connect the system to data, contextualize the data and bring the system into operation. If each of the cross-system data interconnections is automated for an enterprise smart manufacturing factory or supply chain application, an average of 250 person-hours per secure interconnection is required. Orchestration of the systems information and the modeling of the data to do the end-of-shift report occur in a spreadsheet limiting the ability to use the information further. Modern cloud products help the IT infrastructure requirements but do not reduce the OT configuration, connectivity, interconnections effectively trapping data just like on-premise siloed vendor applications.

Reducing the Heavy Lift of Data Modeling and Contextualization

Considerable time, effort and expense may be invested in the design, development and deployment of an individual operational data/modeling system. Each application developed produces data models for contextualized data and model configuration knowhow that are not readily reused because of lock-in with the physical operation modeling vendor, type, mode and objective as shown in FIG. 1. Accordingly, many embodiments of the invention provide for the building of a data/model system that is able to leverage the knowhow with templates for a next similar application. As an example of a data/model system using templates in accordance with an embodiment of the invention is for a smart performance application for a Steam Methane Reformer (SMR) described below.

In this example, the SMR has a large cubical shaped structure with elevation and side dimensions approaching 50 ft. and a combustion chamber insulated with refractory walls. The topfired furnace has 336 reformer tubes (7 rows each with 48 tubes) and 96 burners and 8 flue gas tunnels. The burners are arranged in 12 rows of 8 burners. Fuel to each burner can be adjusted with a throttle valve located on each burner. Each of the reformer tubes are 40 ft. in length. Careful management of the temperature spatially throughout the furnace may be required because a persistent temperature of greater than 20 C above the maximum tube wall temperature reduces the life expectancy of reformer tubes by half. There can be significant variations in local furnace temperatures due to variations in fuel and air flows to each burner as well as non-ideal flue gas flow patterns inside the furnace.

The performance objective is to measure and control for a much more even spatial temperature distribution at all times avoiding hot or cold spots so the overall furnace temperature can be increased to increase energy and therefore hydrogen productivity of the SMR. A total of eight infrared cameras and 70 thermocouples were installed to measure the tube wall temperatures and spatial temperature distribution throughout the furnace in real time. The harsh, high temperature furnace environment and the vibrations of the furnace produce noisy, and at times corrupted, IR camera data. Thermocouple data can be short-lived and becomes missing information. Real-time infrared camera image data were mapped into spatially located temperature data points and stored in an edge historian. Additional data such as fuel and production flows, were drawn from the control systems.

Figure 3:
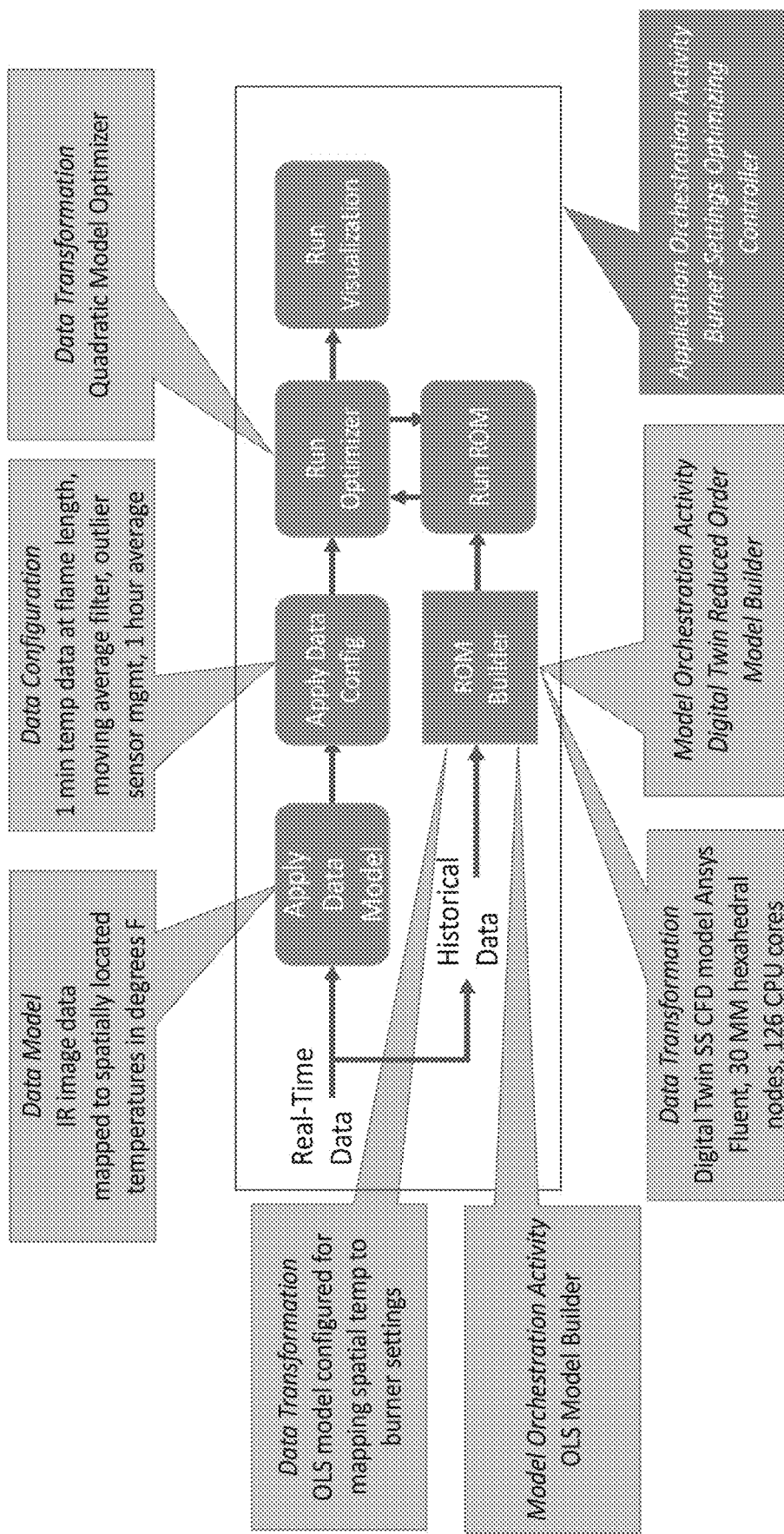
FIG. 3 illustrates an example of knowhow reusability in a smart application in accordance with an embodiment of the invention.

An example of engineering knowhow reusability in a smart application in accordance with an embodiment of the invention is illustrated in FIG. 3. As shown in FIG. 3, there may be multiple ways to reuse the engineering knowhow of having developed and implemented a smart application. For example, mapping the IR camera image data to temperature data spatially located throughout the furnace may have required considerable development to ensure spatial coverage, address overlapping camera data and cross verify the spatial temperature measurements from IR images with point values of thermocouple data. When the proprietary operating data are separated out what is left is a data model for an IR camera temperature sensor system for a geometrically square SMR furnace. Accordingly, many embodiments of the invention may define this as an SM Profile for the sensor system as a device. Accordingly, to actually use the operational temperature data, the data may need to be further contextualized and configured for the subsequent model transformations. Again, significant effort may need to go into determining that an axial temperature plane 15 ft. from the top of the SMR furnace, corresponding to length of the burner flame, was the best location for estimating where tube temperatures would be highest at any point in time. Also, axial plane temperatures collected at one-minute intervals and averaged over one-hour time horizons produced sufficient accuracy and precision. Corrupted IR camera data could be cross-validated and replaced with readings from overlapping camera images. As above, when the operating data are removed what is left is a contextualized data configuration and a corrupted data template for using the real-time spatial temperature data in SMR furnace models.

As shown, real-time operating data can be continuously going into a store of historical data that are available to build and update a Reduced Order Model (ROM) that maps spatially distributed furnace temperatures to spatially distributed fuel settings for the 96 burners. The ROM can run fast enough to be used in operation. An Optimizer may be used as a Data Transformation model configured to iterate with the ROM to determine optimum burner setting and size of changes. These can be output as a visualization for operator action. The configuration of the Optimizer as an optimizing controller and how it interacts with the ROM is reusable engineering knowhow in the form of model configurations and workflows about how to configure and use the models.

Different modeling approaches can be applied. One was to build an Ordinary Least Squares model directly from historical data. Once the OLS model was worked out, there was a reusable ROM configuration and a machine learning strategy and routine using furnace temperature and burner setting data. Many embodiment provide this as a Model Orchestration Activity as illustrated in FIG. 3. In many embodiments, a modeling approach was to develop a Digital Twin of the furnace and use the temperature predictions to build the ROM by iterating between the Digital Twin temperatures and the ROM predicted temperatures until convergence. The Digital Twin strategy is illustrated with the lower green boxes in FIG. 3 where there is the Digital Twin model itself and a Model Orchestration Activity using the Digital Twin to build the ROM. The Digital Twin model itself can be a Computational Fluid Dynamics—CFD model of the furnace developed as an Ansys Fluent model constructed with a computational mesh of 30 million nodes that runs on 128 parallelized CPU cores. A single calculation could take up to 72 hours of CPU time to converge. Just using the Digital Twin may involve another workflow to automate changing conditions and converging the computation. The model configuration template and the Model Orchestration Activities are associated with an SMR furnace SM Profile.

In many embodiments, there can be an overall optimizing-control application for leveling and raising the temperature distribution in the furnace with the ROM-Optimizer shown in the lined box of FIG. 3 that brings all of the components together. When all of the data models, data configurations, data transformations and model orchestration activities are orchestrated together they form an Application Orchestration Activity for the SMR furnace.

The SMR example illustrated in FIG. 3 brings out how data modeling, data configurations, model configurations and model and application orchestration activities can be captured as reusable templates and workflows that are associated with devices and processes. The example also brings out that when appropriately structured these templates can build from each other through multiple efforts to extend capability and/or applicability under different physical situations. While many ways for providing reusability of engineering knowhow are described with reference to FIG. 3, any of a variety of mechanisms for providing reusable engineering knowhow can be utilized as appropriate to the requirements of specific applications in accordance with various embodiments of the invention.

Data Centric View of Smart Manufacturing

Figure 4:
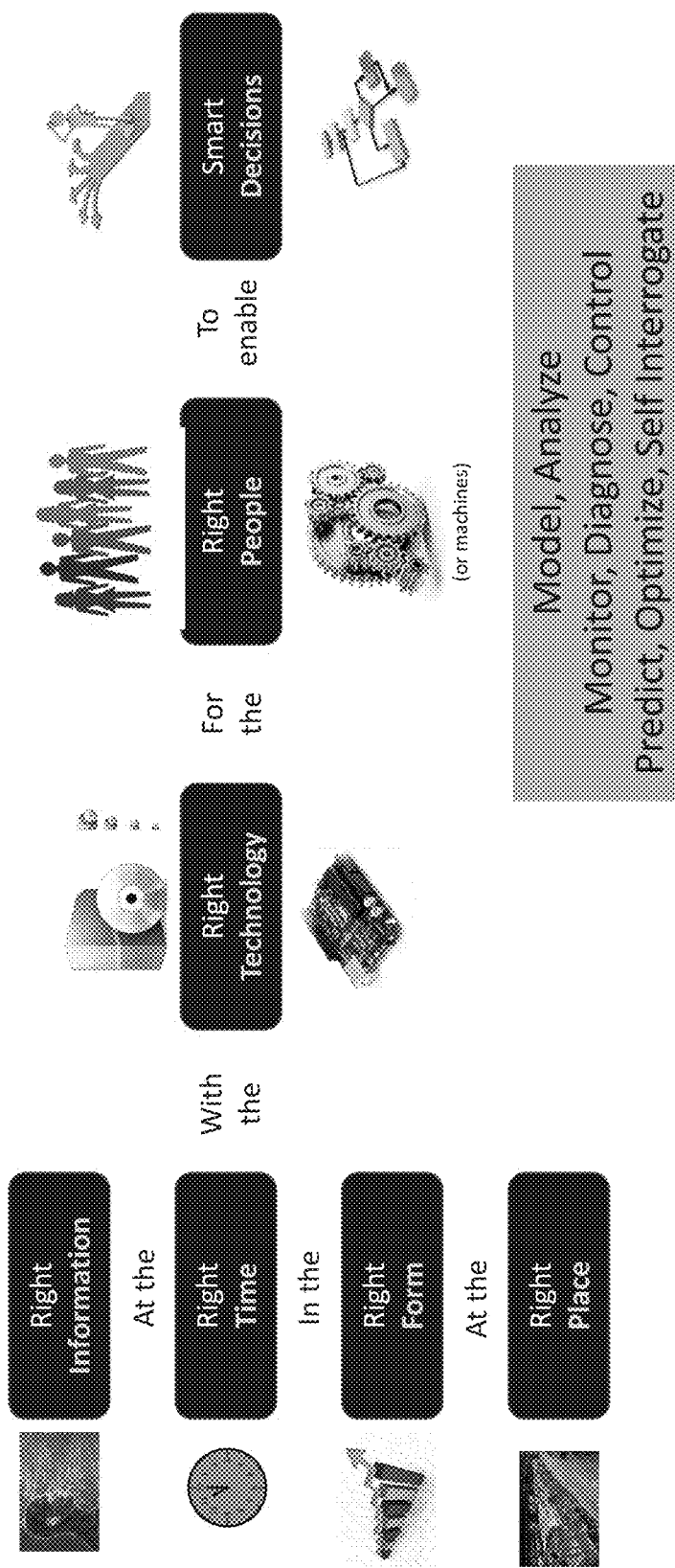
FIG. 4 illustrates data centric characteristics of smart manufacturing in accordance with an embodiment of the invention.

As illustrated in FIG. 4, Smart Manufacturing builds first on the concept of "Right Information." Right Information is defined as contextualized, interpreted data in the right Form, at the right Time and in the right Place, ready for consumption. Data and Information (i.e. actionable data) can be used to set up for various manufacturing execution and operational actions through data transformations and model orchestration activities. Shown in FIG. 4 are common data transformation and model orchestration objectives encompassing exploration (model, analyze), reaction (monitor, diagnose, control) and pro action (predict, optimize, self-interrogate).

As shown in FIG. 4, the Right Technology, the Right People, and the Right Automation are application orchestrations to enable smart decisions and actions and to achieve business and operational objectives. Execution can be used to mean any level of manufacturing process operation (individual asset to supply chain) that is run to a specified set of demand instructions, e.g. a recipe. Human-centered operations may be any aspects of manufacturing execution run or changed using human decision making. Automation may be any execution run or changed using algorithmic decision making. Operational Technologies (OT) may be the digital control, automation, visualization execution and business systems and the "OT Data" that interface with the physical manufacturing facilities. Included in OT may be the instantiated data models and configurations, data transformations, model orchestrations and application orchestrations that can be designed, sustained and used in operation. Information Technologies (IT) can be the data networking, streaming, storage, computation, management, security and communications that are conjoined with OT.

In this data centric view, IT can refer to data generated, stored, communicated without operational context, while OT Data can be contextualized, analyzed, transformed and used in operational context to actuate physical operations. OT/IT convergence foundationally implies OT Data at all times, e.g. data have operational context at all times and all places, but are used and enabled by IT capabilities. Data transformations in the form of algorithms, machine learned models, simulations, digital twins, etc. can be synonymous with data in that they are constructed or validated with data and are used to produce/transform data for operational use.

In many embodiments, orchestration can be used at two levels. First it may be used to describe how data transformation models are orchestrated with data models and configurations instantiated with OT Data to meet an individual data transformation objective. Orchestration can also be used at an application level to describe how multiple data transformations, time, and human centered and automated execution come together into an economic, sustainable, safe manufacturing enterprise application. Time can be a distinguishing attribute for Smart Manufacturing in that the value of a right action is highly dependent on whether it is 'at the right time' or 'in time.' At a fundamental level Smart Manufacturing can require time to be a primary variable such that the overall orchestration, transformation, and execution are all responsive to time.

The Building Blocks of Smart Manufacturing

Figure 5:
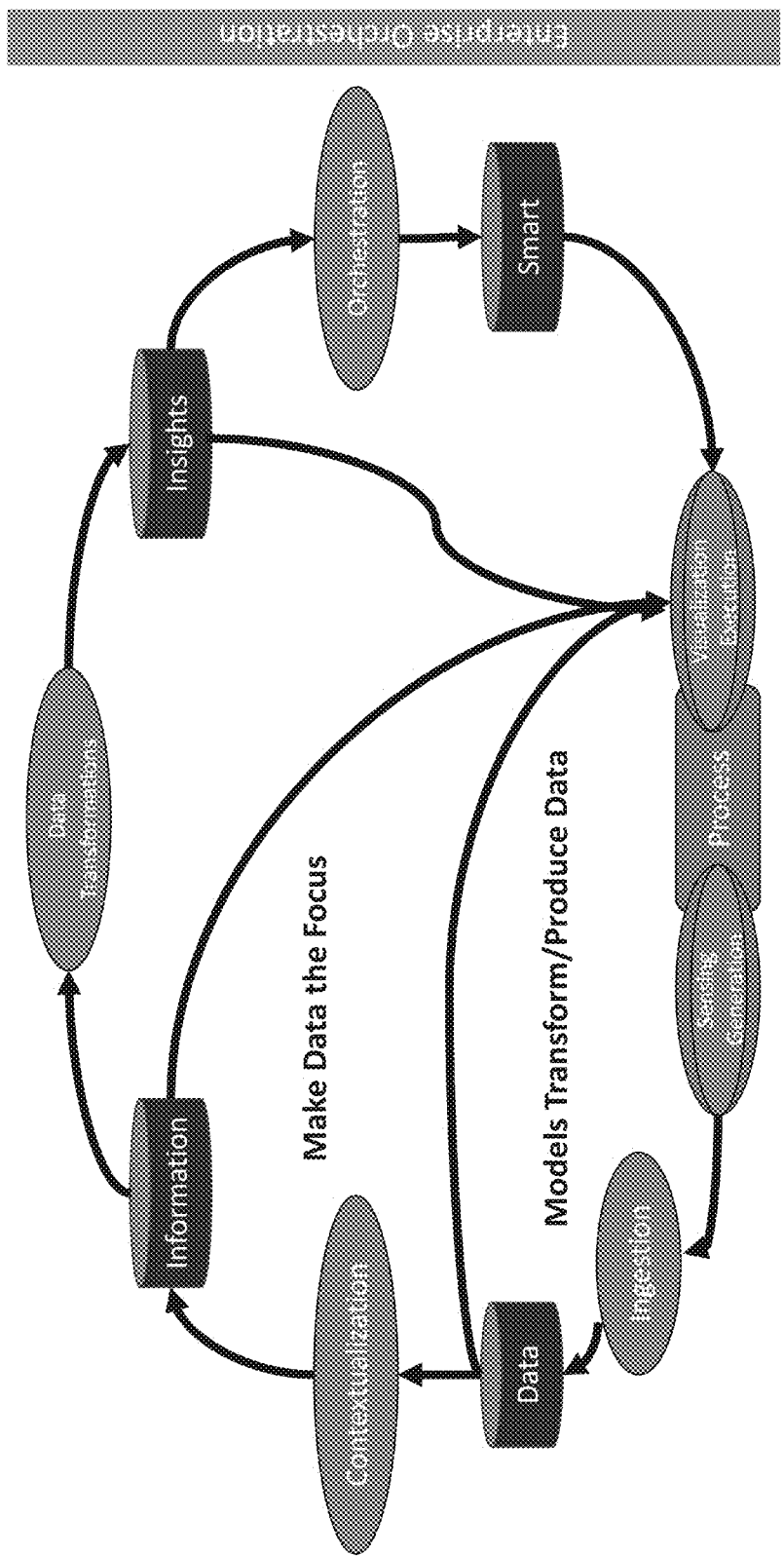
FIG. 5 illustrates data centric building blocks of smart manufacturing in accordance with an embodiment of the invention.

FIG. 5 illustrates a generalized data centric building block data functions and processes that make up Smart Manufacturing in accordance with an embodiment of the invention. As shown in FIG. 5, there is a process comprised of physical assets, for example a machine, a process operation or an enterprise and associated sensors and the physical and human means for actuation. Moving clockwise, there are physical assets and people that sense, infer, generate and stream digitized data of many types, some of which are acted upon at device level forms of the data, e.g. safety functions, interlocks. There may be cyberphysical interfaces. For example, a sensor is a physical device that generates and stores digitalized data. The storage icons illustrated in FIG. 5 indicate reusable data banks of contextualized data in appropriate storage and database management systems.

For operating data to be used for higher level modeling functions, such as integrated alarms and visualizations, data can be modeled, aggregated, contextualized and interpreted to form information—data for purpose. These contextualized data can be now consumable after appropriate data transformation with model orchestrated activities such as analytics, monitoring, diagnosis, among various other operations which provide higher level operational insights. At the highest level of operational execution, data, information and transformations can be further contextualized and orchestrated together for optimization, prediction, and automated and operator-involved actions that drive high-level operational and business objectives. In many embodiments, Smart Manufacturing can include not only the component cyber and physical technologies that produce and use data but also the necessary instantiation, integration, orchestration and execution of any or all four levels of data-driven action throughout a manufacturing enterprise. From a business perspective Smart Manufacturing allows manufacturers and their supply chain partnerships to transform their operations from being reactive (responding to what happened) to being proactive (predicting when things will happen and influencing future outcomes).

FIG. 5 illustrates that the Data as the focus of attention, acting on the physical process. There can be the cyber functions in the ovals producing progressively greater levels of contextualized, transformed and orchestrated data repositories. The lines illustrated in FIG. 5 can be the data connections, interfaces, communications, security to provision and operationalize the data, called the core capabilities. The storage icons can be the database management systems from which the data are provisioned. The vertical bar to the right is the Application Orchestration that may be used to make all elements work together and act as an overall application in time. From a Data Centric perspective, the contextualized OT Data can be viewed as key assets. There can be an overall mindset change in that Data are key assets, models act to transform and produce Data in useful forms that drive the process.

Figure 6:
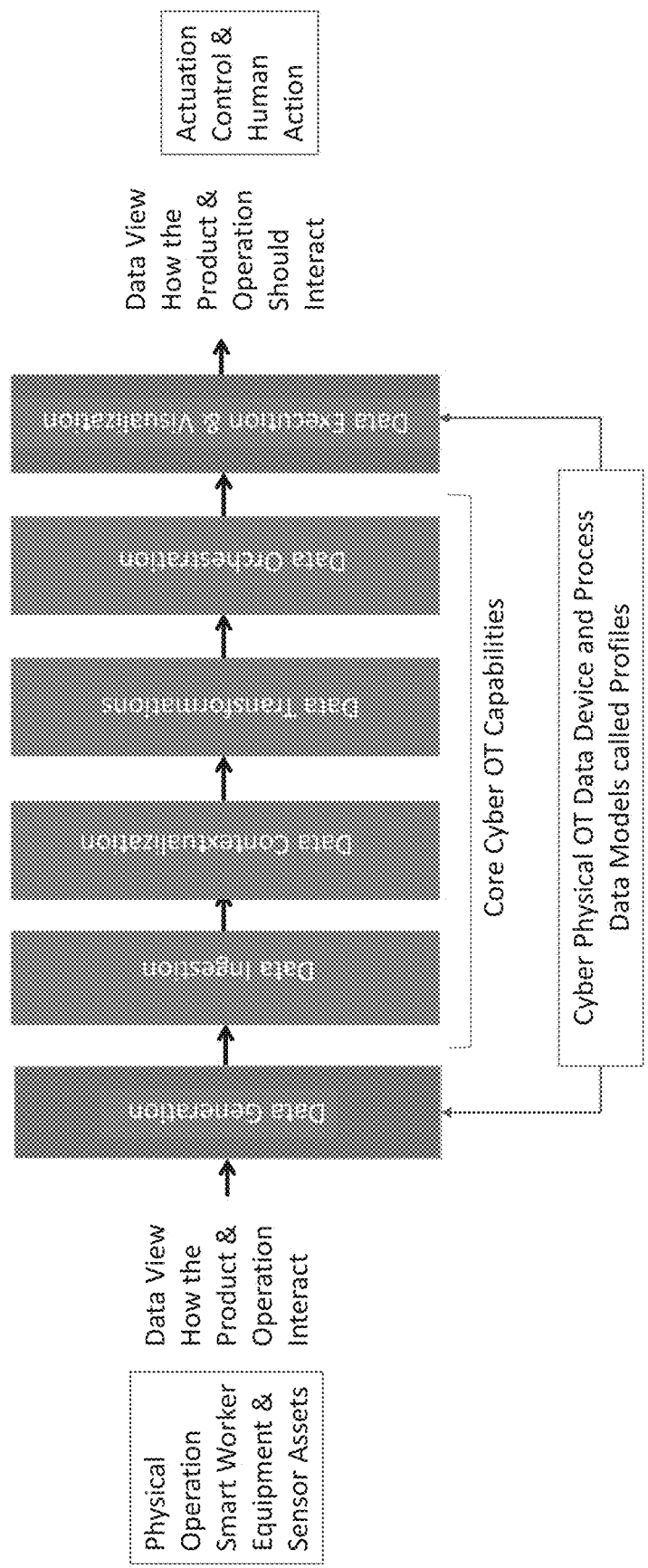
FIG. 6 illustrates end-to-end cyber OT data lifecycle model in accordance with an embodiment of the invention.

With reference to FIG. 5, data generation, ingestion, data contextualization, data transformation and orchestration are recognized as a repeatable Data Lifecycle pattern, which is shown in FIG. 6 in accordance with an embodiment of the invention. Data centricity can be a principle that makes it possible to structurally leverage this repeatability. As shown on the left of FIG. 6, physical operations, facilities, humans-in-the-loop and sensor assets may generate data. There may need to be a cyber physical interface and the physical OT side framework for validating and contextualizing data. Similarly, on the right-hand side data, after they have been ingested, contextualized, transformed, and orchestrated, they can be provisioned for physical execution and/or visualization and human-centered actualization, again may need a cyber physical interface. In many embodiments, this Data Lifecycle view makes it possible to establish Core Cyber OT Capabilities that are reusable and/or sharable for cyber-side data operations. When separated from physical model types and modes, these cyber capabilities make up reusable OT/IT infrastructure that may not need to be reconstructed for each physical application even though the physical operation and modeling type may be quite different. This separation of cyber and physical data modeling can be key to managing to a much smaller set of core cyber data capabilities and the utility of infrastructure that does not need to be built for every application.

The cyber physical endpoints in the two color shades are addressed with SM Profiles that can be templatized operational data contextualization models, data configurations and data transformations for physical assets. SM Profiles in accordance with many embodiments can include the interfaces and are architected for interfacing physical- and cyber-side data generation and first level contextualizations and physical-side visualization, actuation and execution. Leveraging cyber and physical in this manner can support vendor agnostic software interoperability since the cyber infrastructure can be common for modeling products and interoperable with sensor and execution systems through the SM Profiles that are structured to integrate with core cyber OT capabilities.

Operational Data Models, SM Profiles™ and the SM Platform™

Taking the SMR example illustrated in FIG. 3 into more technical detail and as an introduction to the more detailed treatment to follow, data centricity in accordance with many embodiments may offer the technical foundations for OT/IT-converged, "core" cyber-side data services as specifications for a Smart Manufacturing (SM) Platform wireframe. The term 'wireframe' may connotes open platform services with the necessary digital interface specifications and services that vendor, experimental, open and community source software products and platforms can "slot" into the wireframe and that users can more easily access and operationalize application products over a full range of on premise, edge, cloud and hybrid data network structures. These specifications may need to be instantiated as a de facto standard for deploying 'smart', real-time data-centric manufacturing operational applications that draw benefit from shared infrastructure. In many embodiments, "de facto standard" provides that there may need to be an agreed position taken on how these core cyber-side capabilities are structured and integrated and how data models and data modeling functions are structured, selected, composed, and orchestrated in the SM Platform wireframe to form data-driven applications that address operational objectives. The wireframe services themselves can be closed in order to manage the de facto standard and the cybersecurity and trusted business data exchange processes.

In many embodiments, the SM Platform wireframe can be purpose-built code that makes it possible to construct sets of core cyber OT data services from software products produced by others. Corresponding to FIG. 5 and FIG. 6, the SM Platform's core services can include secure wireframe capabilities for slotting in software products for data ingestion, data contextualization/configuration, and the workflow orchestration of selectable, composable and fillable SM Profiles once instantiated with data. The SM Platform in accordance with many embodiments may also build in core data store and management products for provisioning data transformations and core trusted services for securely exchanging selected business data with a wide range of exchange formats. In many embodiments, SM Profiles can be OT Data model templates and device/process model configurations constructed, merged or inherited to expose structured data to the wireframe. "Filling in" operational-specific information into data contextualization templates and model configuration schema for proven manufacturing applications populates an SM Profile instance for ready interoperability with core data services.

As illustrated with the SMR example, SM Profiles in accordance with many embodiments can be physical asset data models that have been developed once. When the operational data that are proprietary are removed, what remains is a data model template and model configuration that can be scaled for broader industry use when data and/or physical assets are used similarly. When multiple SM Profiles are instantiated and augmented with intermediate data transformations, they form Model Orchestration Activity Profiles that may also have scalable or reuse value as an orchestrated data transformation in application. When all elements are orchestrated together they form an SM Application Orchestration Activity Profile.

While these shared core data services can radically reduce the cost and time of setting up infrastructure for ingestion, contextualization and consumption of data, SM Profiles and SM Model Orchestration and SM Application Orchestration Activity Profiles may be the frontline application OT data templates and model configurations that define the contextualized data for sensors, devices, machines, and process assets. In many embodiments, they are reusable and searchable 'building blocks' that are manufacturer-independent and vendor-agnostic and defined in practical use at that level of device or process decomposition that offers value in the reusability of the template, e.g. a sensor and the data models for the data generated are likely useful but data models for individual components and circuitry of the sensor are probably not useful.

Figure 7:
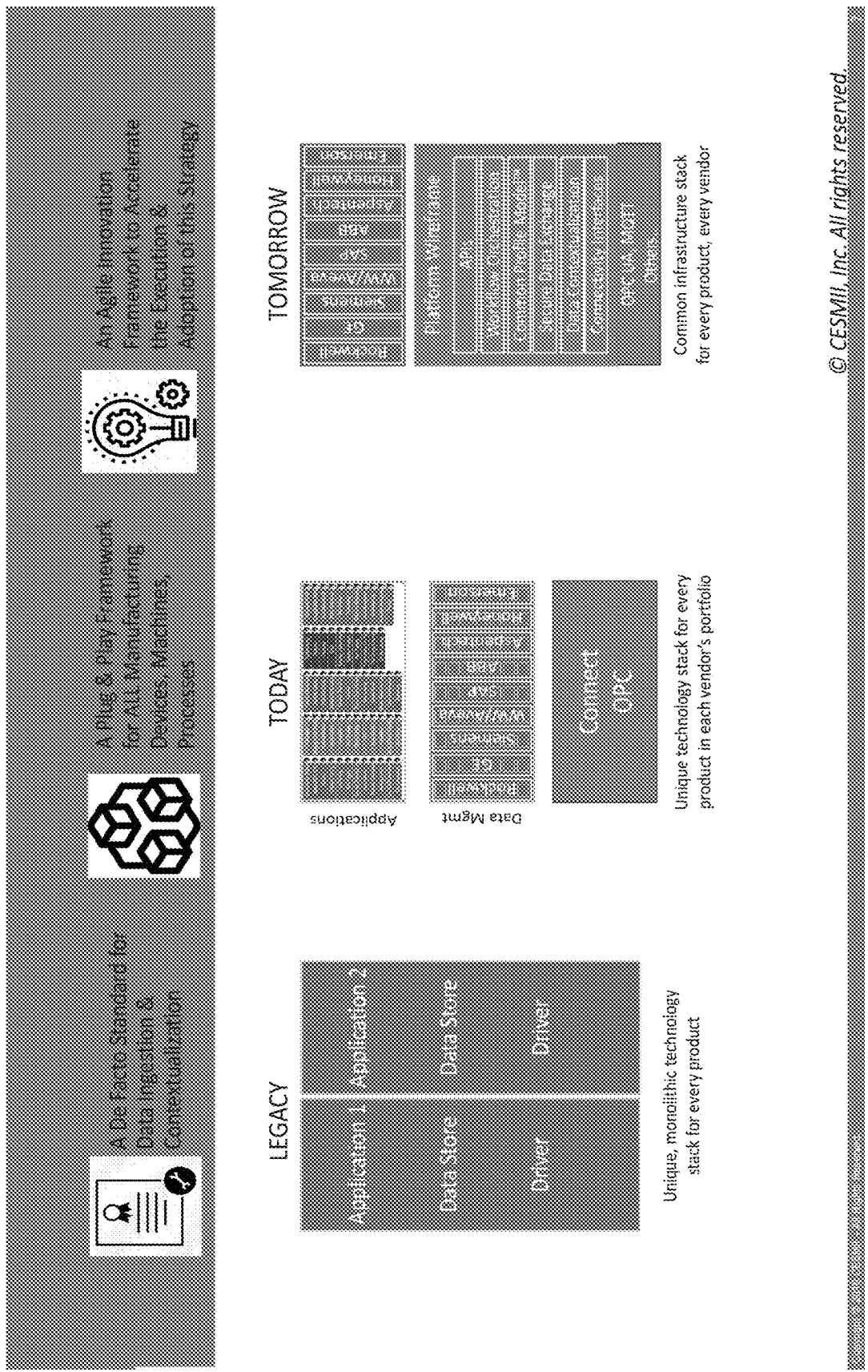
FIG. 7 illustrates a smart manufacturing platform as new baseline OT infrastructure for vendors and app developers to build on in accordance with an embodiment of the invention.

FIG. 7 illustrates an SM Platform and SM Profiles together in accordance with an embodiment of the invention. The left-hand LEGACY view depicts typical single legacy applications in which all OT and IT technologies are vertically developed and implemented to the operational application. The results are monolithic technology stacks designed uniquely for each product. In the TODAY graphic the manufacturing market has seen value in common connectivity standards with some emerging headway. OPC or Open Process Communications standards are illustrated as an example. Another example is Industry 4.0 in Germany, which has standardized on the physical hardware connections.

The TOMORROW view of FIG. 7 illustrates that there is continuing progress at the connection and data connectivity layer with OPC Unified Architecture (OPC UA), Message Queuing Telemetry Transport (MQTT), etc. but there is still a unique data contextualization and management technology stack for every product in each vendor's portfolio at the systems and data and applications layers making it difficult to impossible to use and reuse data across applications.

In the TOMORROW graphic, the SM Platform in accordance with many embodiments of the invention captures four primary leverage points of a common infrastructure stack for greater interconnected simplicity: (1) access to expanding data ingestion protocols that can be specified and aligned for different SM Profile data models or when a single profile may have adapters for multiple protocols; (2) a platform "wireframe" for slotting in various software capability services and products into an interoperable technology stack of core OT Data contextualization services; (3) the ability to build application data model templates and model configurations by separating out protected operating data; and (4) the ability to integrate a wide diversity of vendor application products as Profile products used within profile interface structures and data contextualization configurations to form operational application systems.

SM Profiles

In a data-centric view, the use of materials and energy, the processing and transformation of materials, the formation of parts, and the assembly and packaging of units and products in manufacturing operational steps and stages are described by the flow and transformation of data.

However, data centricity alone is insufficient to address contextualized OT Data requirements and needs to be enhanced with decision-centric modeling to drive contextualization, model transformations and orchestration. For example, data contextualized and used for abnormal situation monitoring is very different than that same data used for diagnosis. In the SMR example described throughout, the use and orchestration of data in the simple OLS model leads to a derivative and extended profile when used with the optimizer. Accordingly, in many embodiments, data centricity together with decision centricity can produce different sub-profiles that enrich a common base profile.

In many embodiments, new sensor and modeling systems offer new kinds of data and features about how operations and the properties of the product generated by those operations come together but these are contextualized within a framework of expected decisions or function. A physics-based process model can produce data and shed light on dominant process features acquired with a data-driven model. Similarly, a data-driven model can be used to improve the physics of a first-principles model. The two kinds of models can be used together operationally to the benefit of the manufacturing objectives. This synergy around purpose is brought out with the SMR example. Data and decision centricity can be also aligned to significant opportunity with autonomous manufacturing assets within an entire value chain enterprise. In particular, as a product moves through the steps and stages of production, the product and the operations that make it, can communicate to establish and control what is needed locally to ensure the product at the end of the value chain. This is the basis for all of the "self's"—self interrogation, self-awareness, self-organization and self-repair.

SM Profiles in accordance with many embodiments may be the device, system and/or process centric and application oriented operational data models that interface physical- and cyber-side data generation and cyber-side data transformations and physical-side actuation and execution in context, as illustrated in FIG. 6 in accordance with an embodiment of the invention. In many embodiments, Profiles can include the configurations for data contextualization and transform models for different objectives, e.g. prediction, associated with the device. An SM Profile in accordance with many embodiments can include the data connectivity, contextualization, model transformation forms for an 'atomic' cyber physical system (CPS) and define a building block CPS device and operational domain that defines the data, information and time environment for the data cyberspace associated with the device or process.

An SM Profile cyber space in accordance with many embodiments can be typically defined by a vendor product for a system but could be defined by a firewall, or an on-premise edge structure. A single sensor that stores digital data, a sensor system that is networked to its own historian, a machine that collects and stores data, a single actuator supported by a digital data system and a controlled operation or set of control operations that manage data for control purposes are all examples of SM Profile device and operation cyber spaces in accordance with many embodiments of the invention. A tightly coupled control system on a device or process can form a single SM Profile cyber space with the device in which data and models are so integrated that individual tasks are indistinguishable. A system that includes the sensor, actuator and set of control operations may have a Profile that exposes aggregate data for that system, or it may have a compound Profile that depends on the Profiles for each of the constituent parts.

Leveraging cyber data and physical operations in this manner supports vendor agnostic software interoperability since the cyber infrastructure can be common for modeling products. Repeatedly-used connections and interfaces with sensors and human and machine execution systems can be captured in the SM Profiles which can be architected to use core capabilities of data ingestion, contextualization, management, and workflow-based orchestration tools.

An SM Profile Machine

Figure 8:
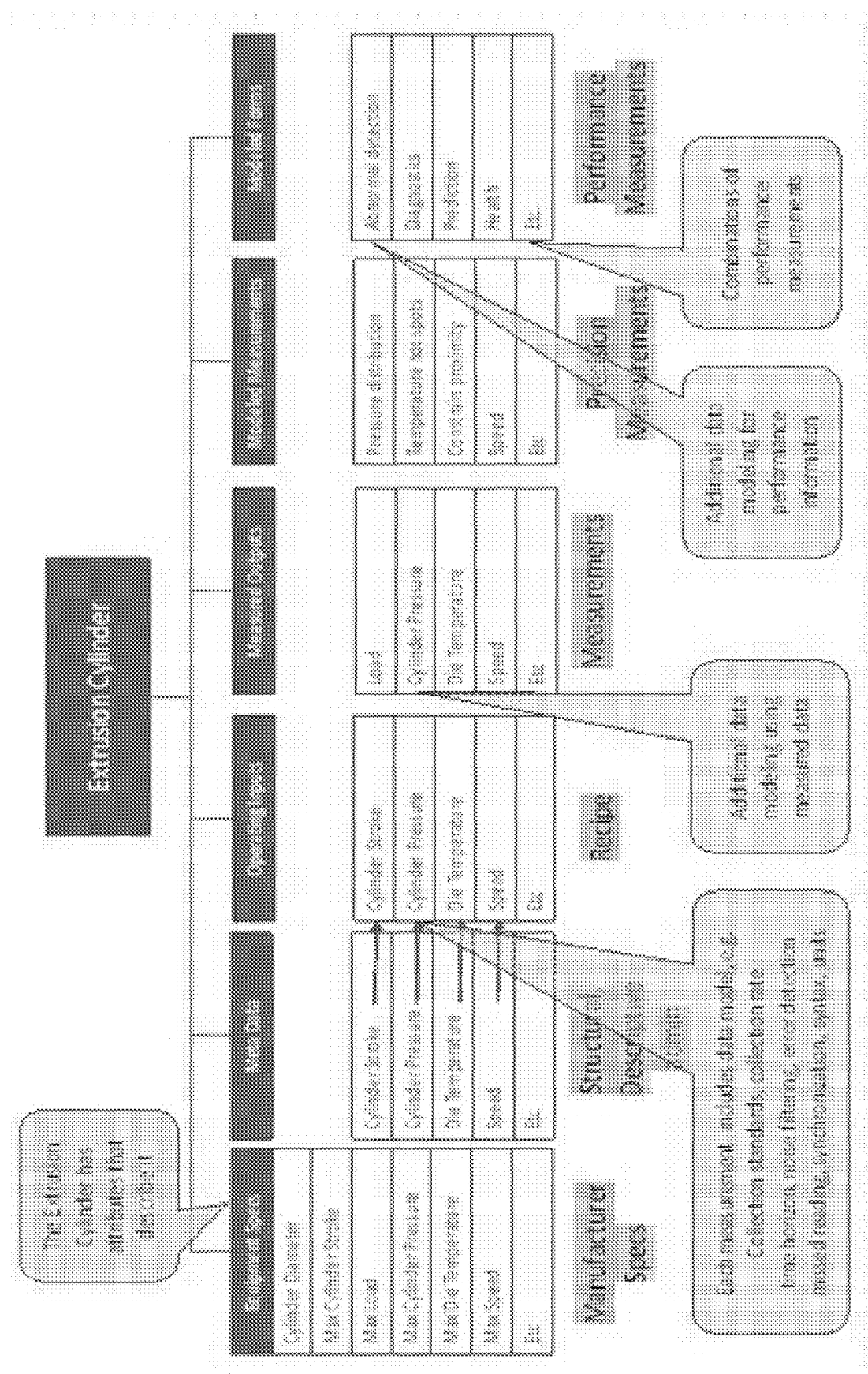
FIG. 8 illustrates an example SM Profile with data expectations for an extrusion cylinder in accordance with an embodiment of the invention.

An SM Profile with a simple machine example for an Extrusion Cylinder in accordance with an embodiment of the invention is illustrated in FIG. 8. The Extrusion Cylinder is one device component of an Extrusion Press, which is comprised of a Cylinder, Pump, Die and Servo-Valve. In developing an SM Profile for each device, it has been determined there are actionable advantages to considering each device function and operation in its own cyberspace and time and then orchestrating the data and models of each as a system-of-systems to manage the overall function of the Extrusion Cylinder in the Extrusion Press. In this particular case the actionable advantage has to do with managing and optimizing the precision of the product quality as direct result of the cylinder operation.

As shown in FIG. 8 there can be equipment specifications, operating inputs, measured outputs, modeled measurements, data transformation and model orchestration activities in a defined schema that can be associated with this particular device and its associated cyber space time. In many embodiments, the SM Profile can embed the standards-based physio-cyber mechanisms for converting a measurement of interest into digitally communicable data or converting digital data into an actuation and a standards-based way to determine conversion time and rate of data so that the operational function of the device can be predicted and communicated. The SM Profile can be able to reference time from an appropriate source and it defines the time horizon that establishes the smallest periodicity for raw data collection and the smallest window in time that data are to be modeled. Reusability addresses structuring and/or building standardized capability so that the clock information is explicit and the Profile can do timing calculations within the cyber space. All data produced can be used or ingested into data stores where each data point carries associated information on time and a set of standards based structural, descriptive and administrative operational metadata. Reusability addresses digitization of measurements into communicable data, time and metadata in a standards-based format.

Figure 9A:
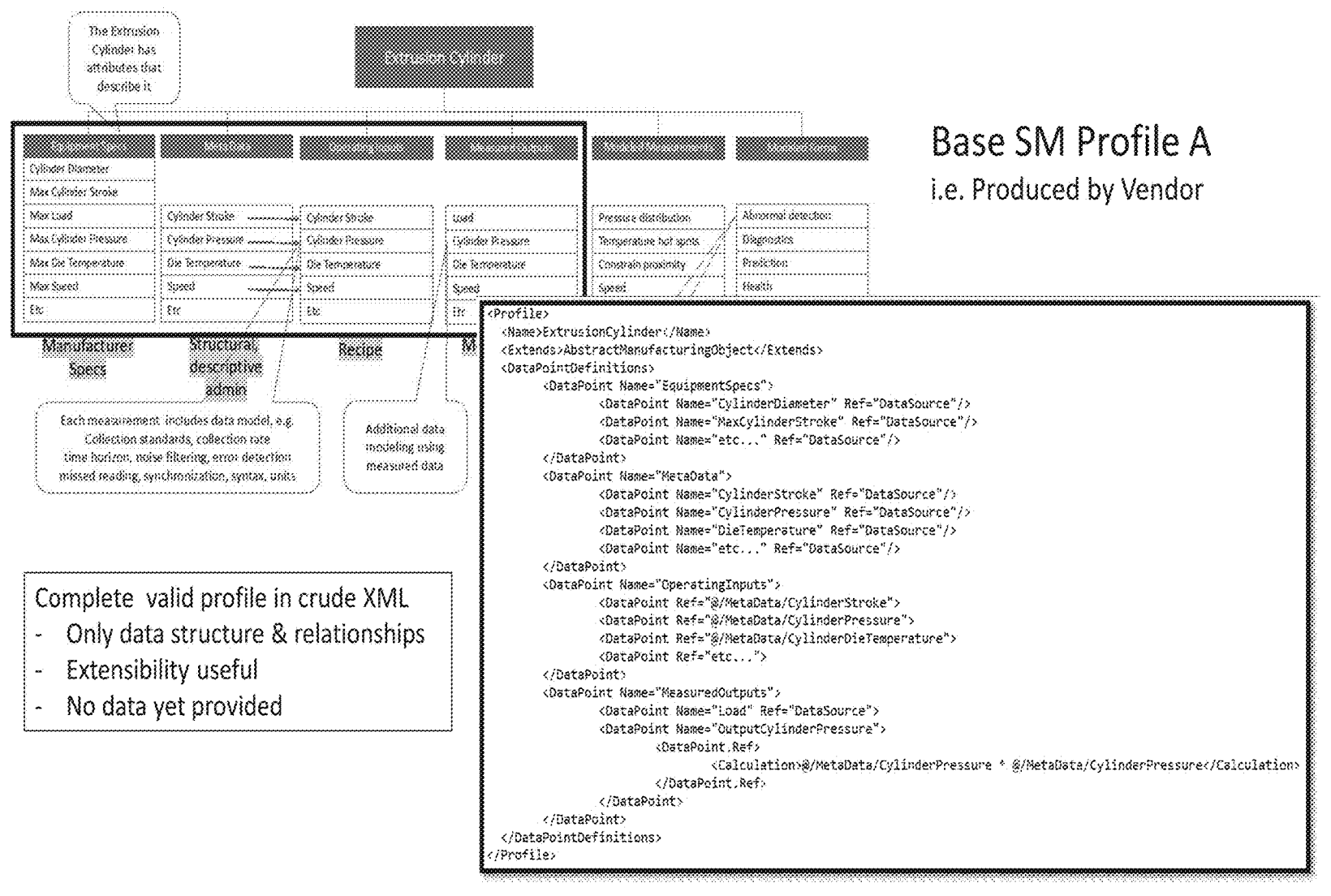
Figure 9B:
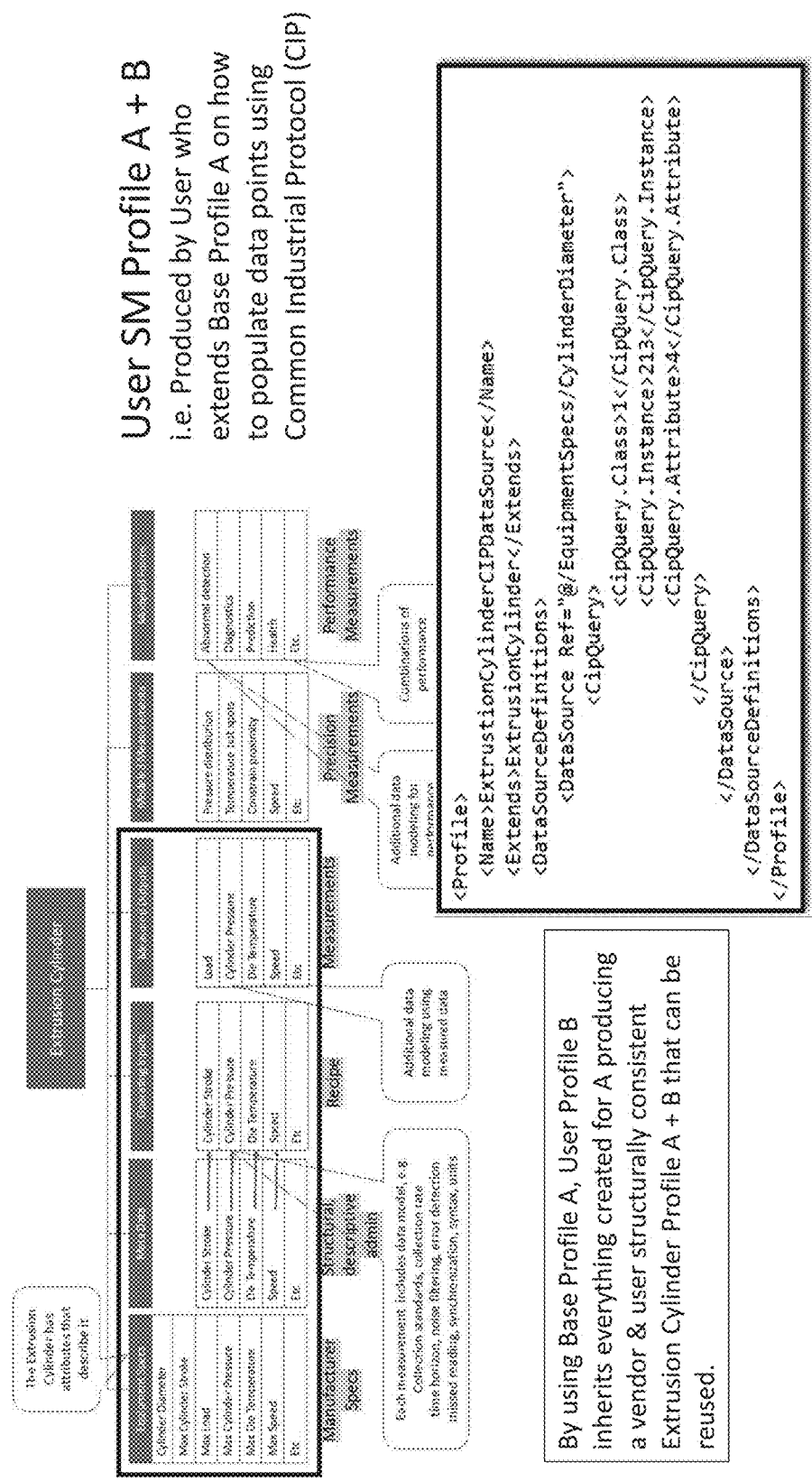
FIG. 9b illustrates a User Profile inheriting properties from a Base Profile in accordance with an embodiment of the invention.
Figure 9C:
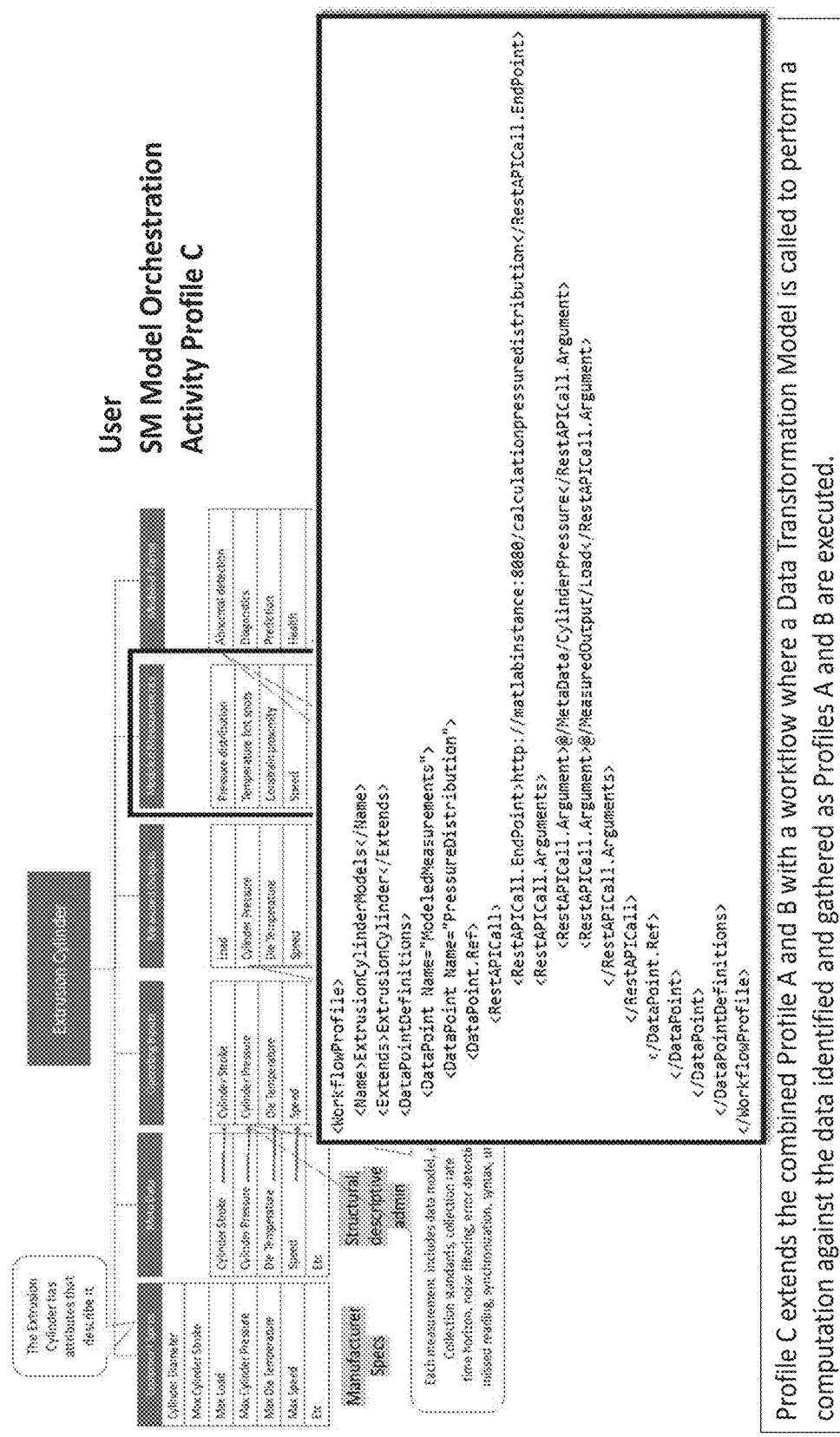
FIG. 9c illustrates executing SM Profiles with a Model Orchestration Activity Profile in accordance with an embodiment of the invention.

While FIG. 8 provides a static view of what a Profile and its structure, the importance and value of the SM Profile approach is illustrated more strongly when used in a process of developing an operational application. Consider FIGS. 9a, 9b and 9c in sequence. FIG. 9a shows a Base SM Profile A in accordance with an embodiment of the invention that has, for example, been produced by the vendor of the extrusion press as a deliverable with the device. Shown as a rough XML example are specific data points and names, data points as operating inputs and data points as measured outputs. In other words, the vendor provides data names and contextualized data useful in the operation of the device. Now consider FIG. 9b where, for example, an integrator has worked out how to populate the data using CIP (Common Industrial Protocol). By using the Base Profile A and extending it with the CIP Profile B for the device there is now a usable combined profile produced by the vendor and the integrator. In FIG. 9c there is a Model Orchestration Activity Profile that calls and executes a data transformation with needed data identified and gathered.

Discretized Modeling

With reference to both this extrusion cylinder example and the SMR example described throughout, when the proprietary operating data and modeling information are removed from the data model what is left is a contextualized data model SM Profile for the device. Similarly, when the proprietary data and operating information are removed from a model transformation, what is left are the model type and configuration and a model orchestration activity workflow.

Importantly, by emphasizing the data lifecycle pattern, e.g. data generation, contextualization, transformation, orchestration and execution in a discretized manner, many embodiments of the invention provide for the capture of data model templates, model configurations for devices and workflows for the different model transformations and their respective objectives, control, as aspects of SM Profiles.

In the SMR example, there can be a template-based reusability for an SM Profile for an infrared camera data model used similarly to measure temperatures spatially. There is reusability for a workflow-based SM Model Orchestration Activity Profile for orchestrating a ROM builder using a high fidelity Digital Twin. There is reusability with an SMR SM Profile containing the CFD model configuration, mesh and convergence strategy for a similar furnace, an SM Profile containing the configuration and training strategy for a similar OLS MATLAB model, and a workflow-based SM Model Orchestration Activity Profile for orchestrating an operational optimizer and control ROM. Importantly each Profile may define the contextualized data, model configurations, data connectivity protocols for the device, process or data transformation in a declarative template which is reusable as a starting point template for similar physical and cyber applications (as such, don't need to build and application from scratch). These all may roll up into an SM Profile for an SMR furnace as a device.

This may lead to Discretized workflow orchestration a form of data modeling that makes it possible to distinguish and work with individual data contextualization models and data modeling transformations as individual steps, in orchestrated combinations and with different approaches for different application objectives. Each step can be an activity that can be associated with a distinguishable cyber space such that time can be managed as appropriate with orchestration and system-of-systems properties. Discretized modeling vs. tightly coupled modeling has orchestration and execution advantages, for example when data needs to be exchanged by business agreement, there are smart workers in-the-loop, there are cross architecture, cross vendor, security management and mitigation opportunities. Executed data in workflow activity context can provide execution pattern data for further operational optimization information and operational behavior for security purposes. Discretized modeling may also have advantages of reusability, composability, orchestrated management and DevOps development approaches.

SM Platform and a Defacto Standard

There has been a need to operationalize a de facto standard for the manufacturing industry to drive advantageous properties for the SM Platform so that the infrastructure can be consistently shared. This may require a new form of open but hyper-scaled digital infrastructure at national and global scales that can be provided by the vendor community. However, a shared, de facto standard needs to be managed for industry by industry through governance. The SM Platform in accordance with many embodiments therefore provides the operational vehicle in which the de facto standard can be governed and managed as a wireframe specification that is still scaled by the vendor community. The wireframe in accordance with many embodiments may define the particular construction of digital services that can be instantiated into an openly accessible platform. All stakeholders, e.g. manufacturers, providers, integrators and innovators can use it to individual and collective advantage through business agreement. Democratization as a business objective can be baked into the wireframe by definition with accessibility to secure core data services and certified SM Profiles that can be instantiated as apps and with converged OT/IT properties of the shared infrastructure.

A de facto standard can be designed and manipulated to drive the desired properties of a stack architecture to address democratizing and accelerating the adoption of Smart Manufacturing while addressing cybersecurity protection and mitigation strategies with interconnectedness. Accordingly, many embodiments of the invention have converged on primary business and operational properties that small, medium and large manufacturers and their supply chains need individually and together to pursue productivity, precision and performance opportunities and to make the technology and business practice accessible by reducing complexity, lowering cost, expanding application extensibility and making it possible to change market drivers with lowered risk. Accordingly, many embodiments provide for digitally-enabled business and operational properties that in turn define the IT required for interconnectivity cybersecurity and comprehensive management of business, operational, information and implementation agreements involving data.

Figure 10:
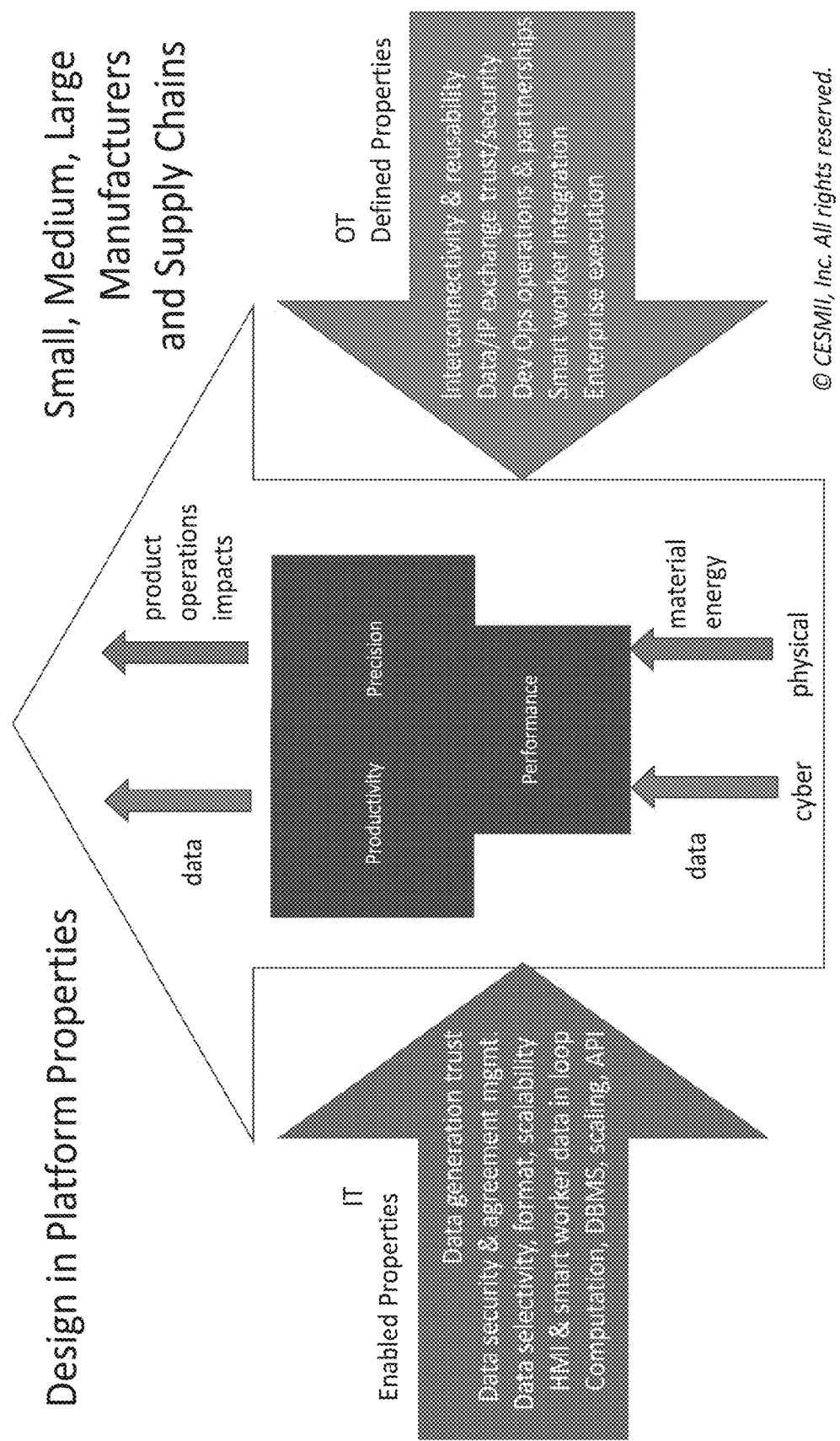
FIG. 10 illustrates OT/IT converged properties for business and technology democratization access and extensibility in accordance with an embodiment of the invention.

In the right- and left-hand arrows of FIG. 10 list these cyber-side OT/IT converged properties that are baked into an SM Platforms wireframe services in accordance with an embodiment of the invention. FIG. 10 illustrates the data-centric view as a cyber flow of data that is distinct from the physical material and energy flows. This distinction is technically and operationally important since many embodiments may wish to build cyber-side operational data infrastructure that can interoperate with the physical-side structure in a dominate manner instead of a subordinate manner. While the physical-side and cyber-side flows and their respective operational data and material transformations are necessarily tightly coupled, cyber data operations and physical manufacturing operations are free to realign differently to address new demands for productivity, precision and efficiency. Just as there are important properties and expectations with physical manufacturing structures and the use of physical assets, there are properties and expectation for cyber infrastructure and the use of data assets.

Technical Foundations and Instantiation of an SM Platform

As developed, Data Centricity can be a key foundation making it possible to orchestrate data in ways that do not need to directly align with functional, structure or behavior of the physical operations. The explicit separation of physical-side cyber spaces defined by SM Profiles in accordance with many embodiments of the invention makes it possible to structurally leverage a repeatable cyber-side lifecycle pattern of data being transformed and applied separately from the physical-side manufacturing operation even though there can be a great diversity of physical operations. The data lifecycle pattern makes it easier to configure cyber infrastructure that is reusable and/or sharable based on common cyber-side patterns of data generation, ingestion, contextualization, transformation, workflow-based orchestration and physical-side interfaces.

Figure 11:
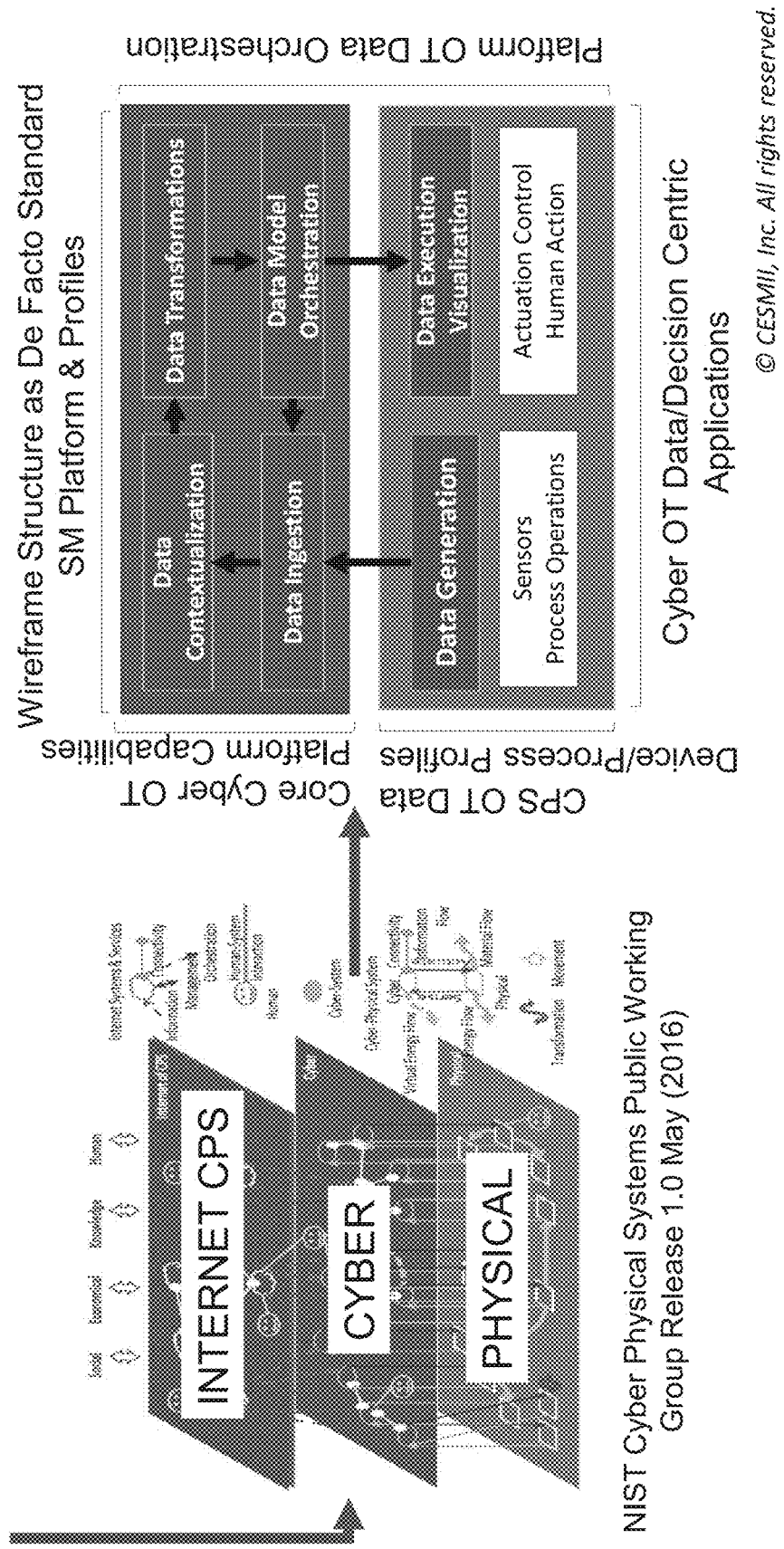
FIG. 11 illustrates Cyber Physical System Foundation of an SM Platform Structure in accordance with an embodiment of the invention.

FIG. 11 shows how the Cyber Physical System (CPS) layered view published by the NIST CPS workgroup can be used to map and enable Core Cyber OT Services with SM Profiles and Orchestration. With reference to FIG. 6, the Data Generation and the Data Execution and Visualization endpoints that interface with the physical layer are shown to indicate cyber data modeling interface capabilities that are overlaid on the physical-layer. The Data Device/Process SM Profiles may include the data model templates for interfacing cyber-layer with the physical layer. The four Core Cyber OT Data Capabilities boxes corresponding to the data lifecycle emphasize cyber layer modeling overlaid on the IT layer that enables them. As shown, the SM Platform may capture all of these capabilities as Core Cyber OT Platform Capabilities (left-hand top). CPS OT Data Device/Process Profiles (left-hand bottom), data and modeling functions are Orchestrated broadly (right) to build Cyber OT Data/Decision Centric applications (bottom). The De Facto Standard (top) specifies how these services come together in a wireframe set of services with defined properties.

Figure 12:
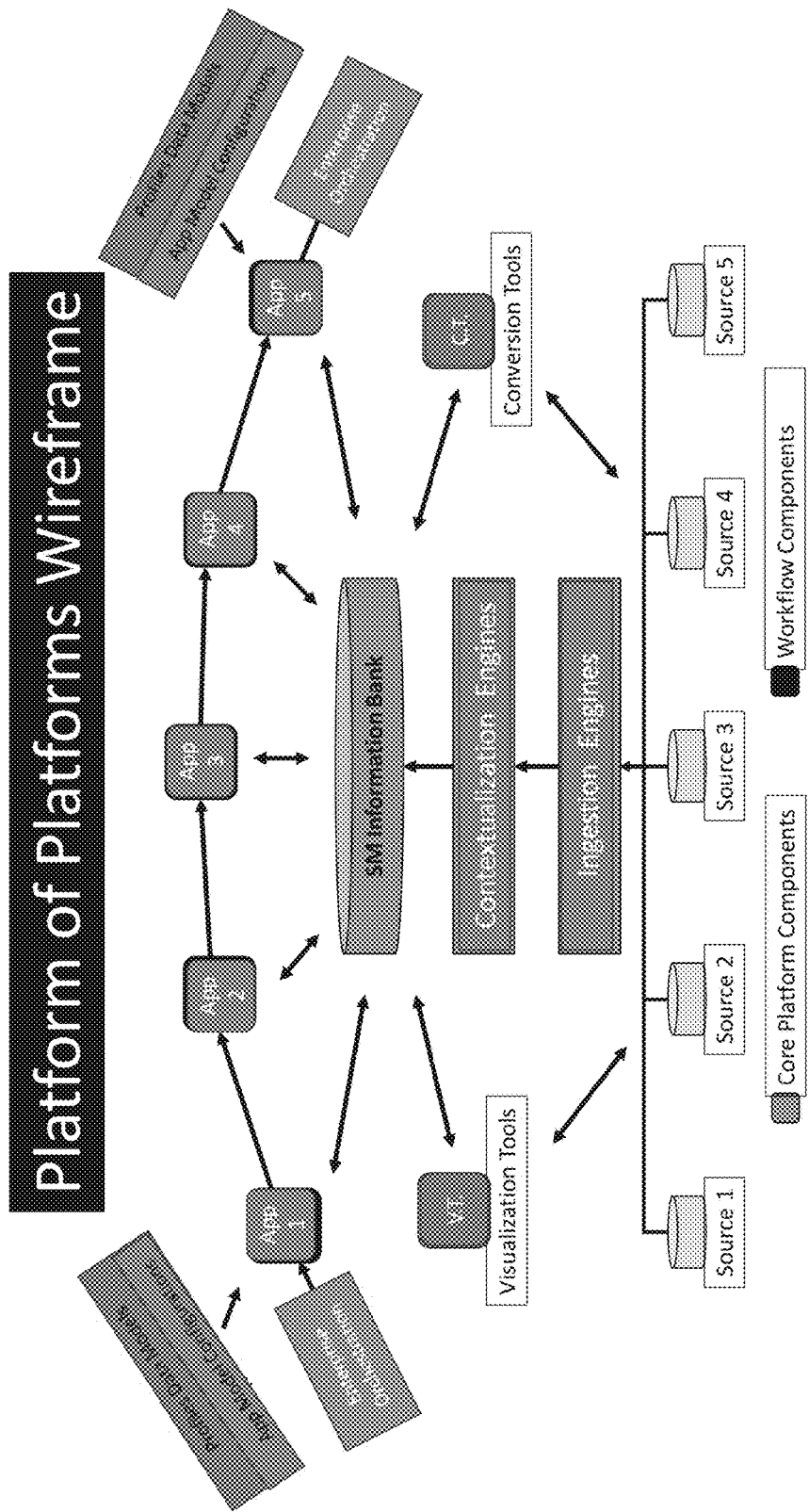
FIG. 12 illustrates functional illustration of an SM Platform Wireframe in accordance with an embodiment of the invention.

To take advantage of platform properties and services and for continued development, the SM Platform can be developed as an open, collaborative and integrated platform based in the wireframe de facto standard. It enables manufacturers to solve problems using operational technology (OT) tools and applications developed by technology providers and subject matter experts in CESMII's eco system as illustrated in FIG. 12 in accordance with an embodiment of the invention.

In many embodiments, data can be ingested in different forms from multiple sources. Different data stores for different types of data are available, ingestion and contextualization engines and tools can be managed as platform functions and not just individual vendor production functions. Apps in the form of "filled in" SM Profile data models and common data model transformations and conversion and visualization tools that are selectable from a marketplace or available as core services can be managed through an enterprise orchestration workflow construct that is vendor agnostic and also provides secure business data exchange tools. As overall wireframe services, the SM Platform in accordance with many embodiments makes it possible to more readily integrate and orchestrate vendor products for overall objectives but also for one vendor product to use the service of another vendor product.

This suite of integrated services may use the de facto standard to describe how the services integrate and how the overall properties become outcomes of the structure. Open may also be defined by the de facto standard, specifying the access and ability to integrate with the wireframe core services and with application profiles, additional data transformation services and tools in a marketplace as a user, provider or integrator. The wireframe services themselves may be closed in order to manage the de facto standard and the security and business trust design and processes. A particularly important closed operational OT/IT converged service is with the data stores. In many embodiments, rather than data stores for every product and the multiple copies of data that result, fewer data stores and fewer copies of data with greater selectivity of data through the business exchange services reduces the security vulnerabilities and enhances security management and mitigation.

Figure 13:
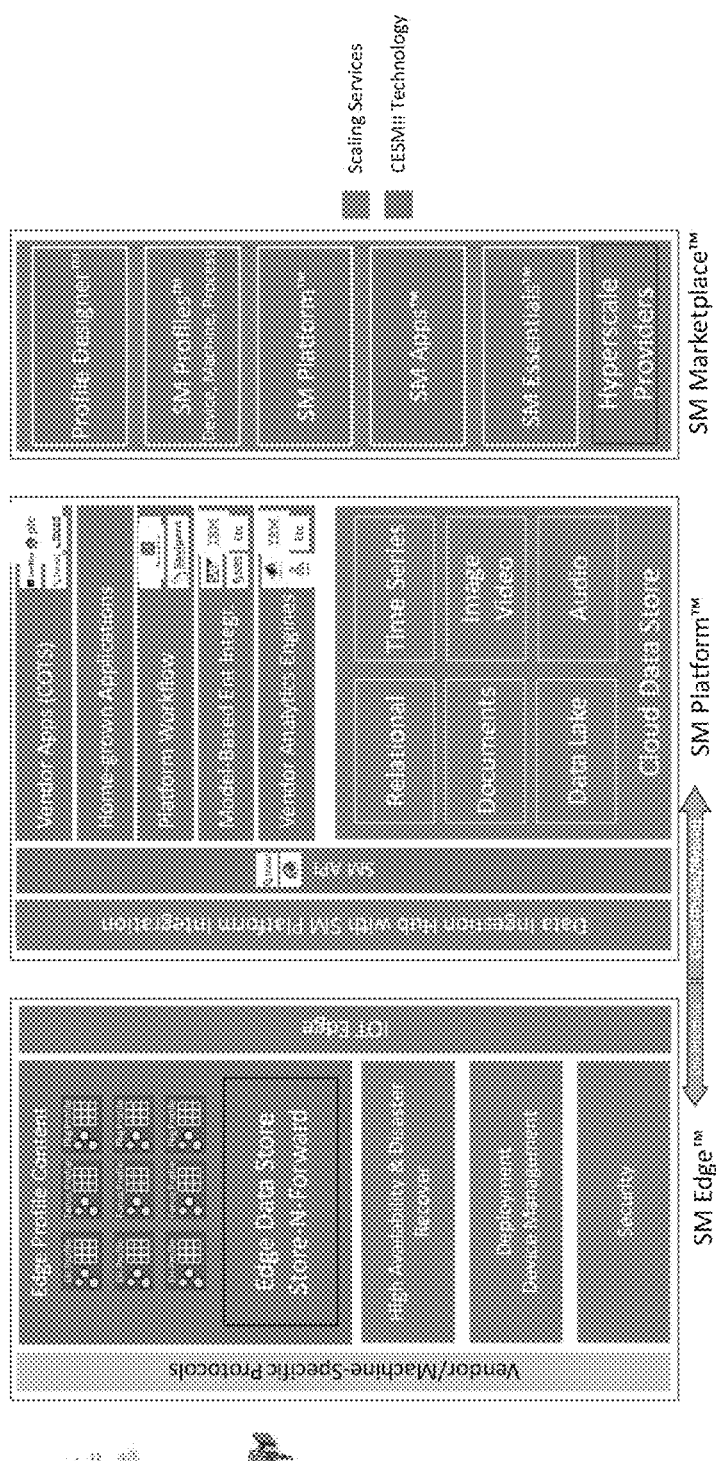
FIG. 13 illustrates an SM Platform as a Wireframe of OT/IT and API services operating in Edge-Cloud structures in accordance with an embodiment of the invention.
Figure 13:
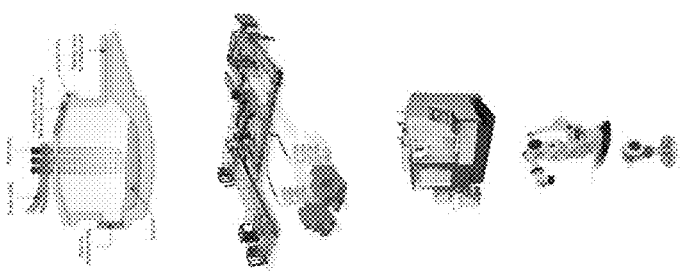

In many embodiments, the SM Platform may be been and operationalized for the cyber space services layer as a Platform-as-a-Service (PaaS) set of wireframe services for Smart Manufacturing data-centric applications using the NIST 800-145 definition as shown in FIG. 13 in accordance with an embodiment of the invention. It is functionally distinguished as PaaS infrastructure designed to support the prescribed set of wireframe OT services. As a de facto standard, the SM Platform in accordance with many embodiments may be built on top of commercial hyperscale Infrastructure-as-a-Service (IaaS) platforms and virtual machines so that cloud and edge capabilities/features such as service-oriented architecture, portability, scalability, programmability, cost model, security, etc. interoperate with other commercial and open source IaaS's, PaaS's and SaaS's (Software-as-a-Service) based on a set of cloud and edge architecture and integration IT standards. The SM Platform may provide the services for the development, deployment, orchestration, and operation of data workflow environments based on Profiles so these can co-exist seamlessly and readily shift between design and operational roles, creating a DevOps environment. In many embodiments, the SM Platform can be instantiated with the selection of vendor products for core services and for Apps. The SM Platform may lay the foundation for multiple partners to create and disseminate innovative cost-effective solutions to small, medium and large manufacturers alike.

In many embodiments, the SM Platform may use cloud orchestration services at the infrastructure layer and extend declarative templates to describe how to construct data workflow environments and resources as reusable SM Profiles. A common Profile Model may provide the de facto standard for interoperability. An important artifact of the platform-of-platforms approach in FIG. 12 in accordance with an embodiment of the invention is that the SM Platform is not just bringing OT and IT services together but is building OT and IT systems-of-systems cyber spaces with emergent behaviors and characteristics that do not need to be fully prescriptive. Behaviors and characteristics can change as systems within systems dynamically change as a result of changing operational and business conditions or decisions. Many embodiments provide the ability to orchestrate systems-of-systems across cyber products, operations, companies and cyber spaces with different time constants that may need predicting and managing the resilience, stability and controllability properties of an end-to-end enterprise systems-of-systems implementation.

Expression and Application of Smart Manufacturing Profiles

In many embodiments, the Smart Manufacturing (SM) Platform may be a combination of strategic technologies useful for organized collection and transmission of manufacturing data, which work together to enable open access to a variety of applications, helping the industry identify constraints, predict challenges, and optimize decision-making and operational orchestration. At a high level, there are three main components to the SM Platform: the Edge, the Core Services, and the Integrated Applications—although the architecture can support many different deployment and scale options, as a general rule the demarcation between components can be as follows:

In many embodiments, the SM Edge resides close to the machine or system that is emitting data, and is used to collect that data in-context and transmit it to the Core Services.

The Core Services can reside in a hyperscale Cloud platform and receive the transmitted data, organize and store it, and make it available to constituent applications and services.

The Integrated Applications can be consumers of the data, but also augmenters and modifiers, that can work together through Workflow orchestrations in a data-centric fashion.

In many embodiments, these components may use or benefit from, the Smart Manufacturing Profile—an enabler to democratizing data access in manufacturing. The SM Profile may provide a "decoder ring" for the source equipment or system, a mechanism for establishing and maintaining the intent and context of the data as it flows through the system, and an interface definition language for programmatic access when the data is at rest in an information system.

The SM Profile as the Abstract Class

Figure 14:
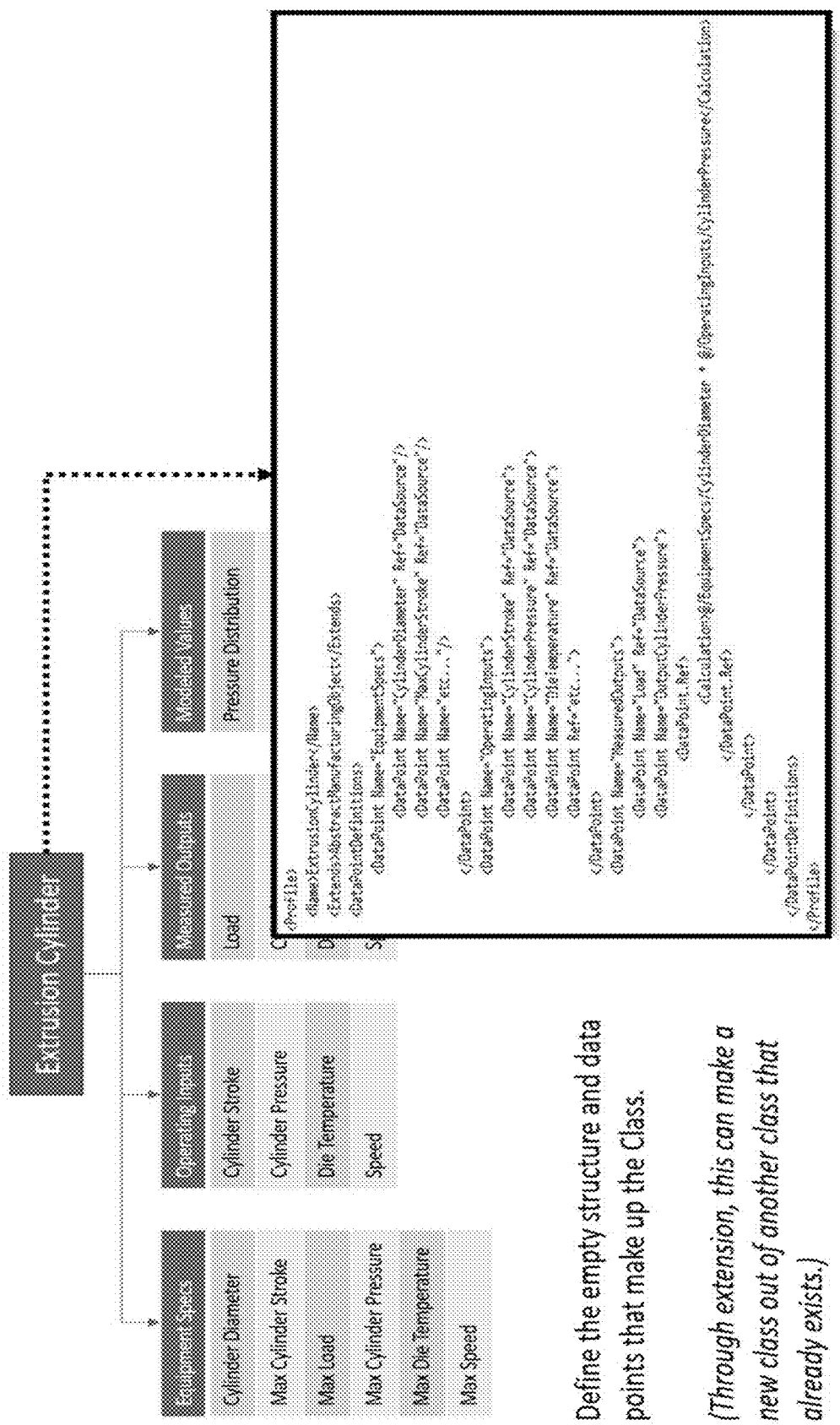
FIG. 14 illustrates an Abstract Profile definition in accordance with an embodiment of the invention.

In many embodiments, at its most primitive level, an SM Profile provides an open-standard language for Class definition, following Object Oriented Programming conventions. This definition can be articulated in the Abstract, and as a derivation—all SM Profiles derive from other SM Profiles, save for the absolute base Class (e.g., called the AbstractManufacturingObject). Class derivation may allow for increasing levels of specificity as a Model matures or is extended by other constituents. In this manner, a broad industry exercise to model Extrusion machines, for example, can be nearly universally applicable—although minimally valuable. Follow-up development that extends that base Extrusion class for specific types of Extruders or extrusion applications can assume the pre-existing functionality and focus on creating new, case-specific value. FIG. 14 illustrates an Abstract Profile definition in accordance with an embodiment of the invention.

As an Abstract Class definition, the primitive SM Profile may include no information about a particular instance, or even how to create or hydrate one; rather it is the data definition (called Data Points from here on) only.

Data Binding the SM Profile Through Instantiation

Figure 15:
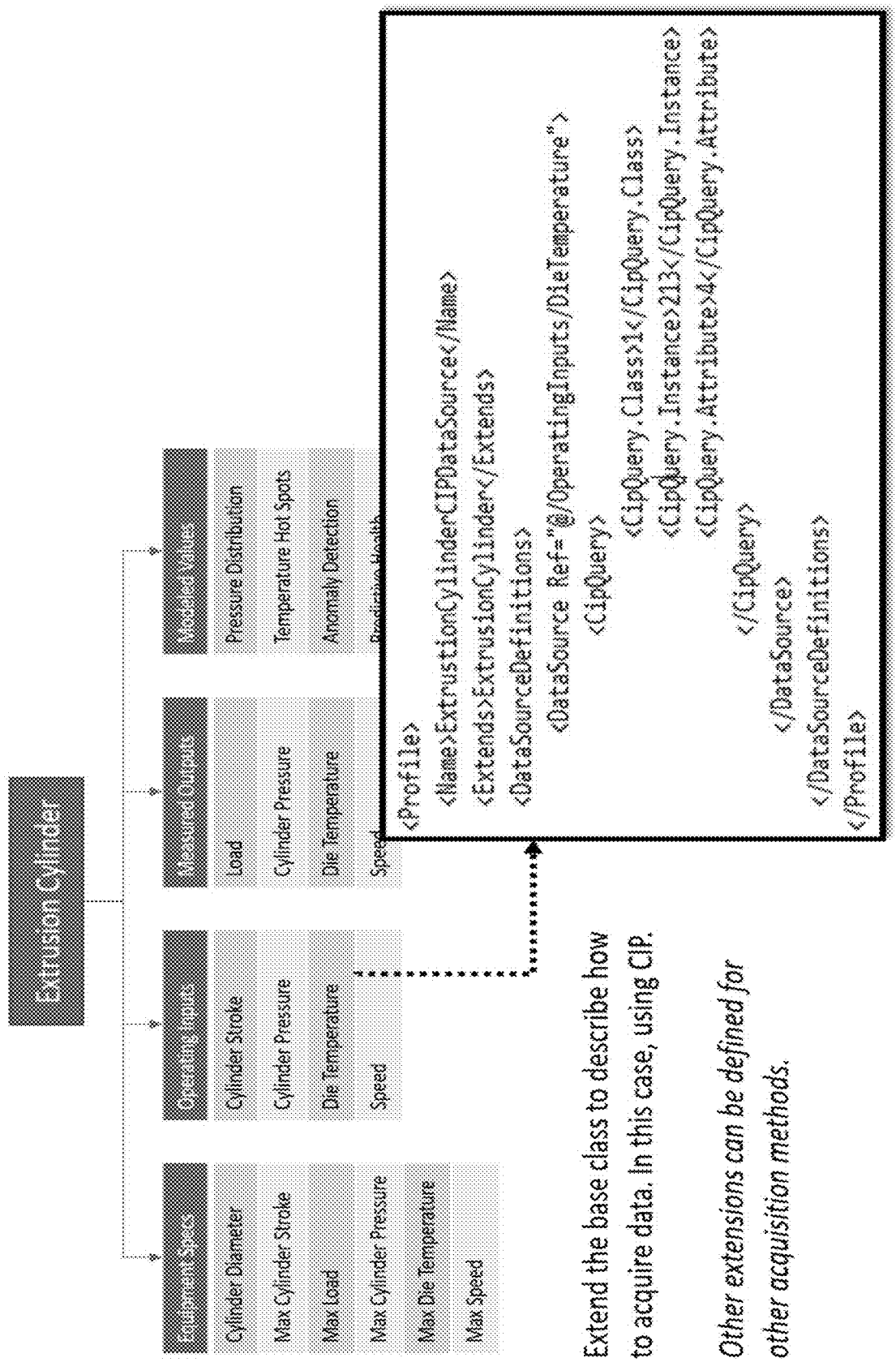
FIG. 15 illustrates a Profile Binding Extension in accordance with an embodiment of the invention.

A practical extension to the Abstract class then is the Data Acquisition extension. Although this creates a derived Class, through application of inheritance principles, this can be a functional extension, not a Model extension. In many embodiments, Multiple Data Acquisition extensions can be declared, and become part of a Compound Class that is assembled by the Interpreter on-the-fly. The Data Acquisition extension provides a Data Source Definition, which indicate the real-world binding instructions that Interpreter uses to bind the Abstract Data Point to a physical Data Source. In many embodiments, the extension does not limit the Data Source definition to a particular protocol—nor does it guarantee that a given Interpreter is capable of communicating over that protocol. It simply provides the communication instructions that should be utilized if an instance and Interpreter pair were available in the real world. FIG. 15 illustrates a profile binding extension in accordance with an embodiment of the invention.

The pairing of an instance of a real world machine/system communicating on a given protocol, that matches an existing Abstract Class definition (SM Profile) and an Interpreter capable of communicating on that protocol results in a programmatic Instantiation of the SM Profile Object in the SM Platform. In many embodiments, this match can be automatically detected with no human intervention. However, since no existing specification provides for universally unique machine or system identification, the near future implementation may require a human to specify a match—specifically, a human will select the Profile that fits what they know about their machine or system and its communication capabilities.

Regardless of how the pairing is identified, in many embodiments, this operation may be performed on the "Edge." The SM Platform can specify a component that is responsible for data acquisition and publication to the core SM Platform services, with appropriate support for secure communication and transmission, fault tolerance, buffering and fail-over. In many embodiments, for reasons of cyber security, do not connect devices, machines or systems directly to the Internet—nor would most manufacturing networks support such a connection. In many embodiments, the SM Edge functions as a data diode, ensuring data can be securely transmitted to the SM Platform, but that no third party may transfer data back to the source machine or system.

As the component usually responsible for data acquisition and instantiation, the SM Edge is the first SM Profile Interpreter. It may include a mechanism for retrieving Profiles from the SM Platform (either through automatic detection or user interaction), an ability to assemble the Compound Class of all applicable Profile extensions on-the-fly, and the ability to instantiate an Object, apply at least the Data Acquisition extension instructions, and execute the requisite communication messaging to the source. Because some communication protocols and device storage mechanisms are necessarily primitive, the Interpreter may need to be able to apply simple combination, concatenation or conversion on-the-fly. Other extensions to the Profile may include ingestion or data rate rules, data type definitions, access control defaults, information characterization, or basic streaming analytics, to be determined in the future. The Edge Interpreter may ignore Profile instructions it does not understand.

Profiles as an Open Interface Definition Language

In many embodiments, the next Profile interpreter is the SM Platform itself—specifically, the Core Services. An important capability of the Core Services is the Context Graph; this is the Relationship Model between object instances. Each object instance delivered by the SM Edge is relatively basic, by virtue of the unapplied Profile extensions that the Edge does not have the ability to Interpret. The Context Graph may augment the Instance by reading in the Profile and morphing the instance to include the members that were ignored on the Edge. This may include rendering or analysis rules, code extensions, integrations with member application APIs, or Workflow extensions. This newly enriched object can be stored in the Context Graph, and related to other objects; it is the SM Platform that may include hierarchical relationships between objects (e.g.: ISA 95, or an Enterprise view). Even constituent parts of a system (e.g.: this machine is made up of 5 devices, and both the machine and the devices have Profiles) can be presented as a flat list by the Edge component. In many embodiments, is can be the responsibility of the Context Graph to find inferred relationships, as well as apply human-curated relationships.

This newly enriched Object stored in the Context Graph may have their member values refreshed via the stream from the Edge component(s), but execution or calculation of the enhanced member values can be performed at the Platform level. In many embodiments, while the Profile definition or extensions may encapsulate, or indicate, code to be executed, the Profile itself may not be an executable file—it's an interpreted file.

Figure 16:
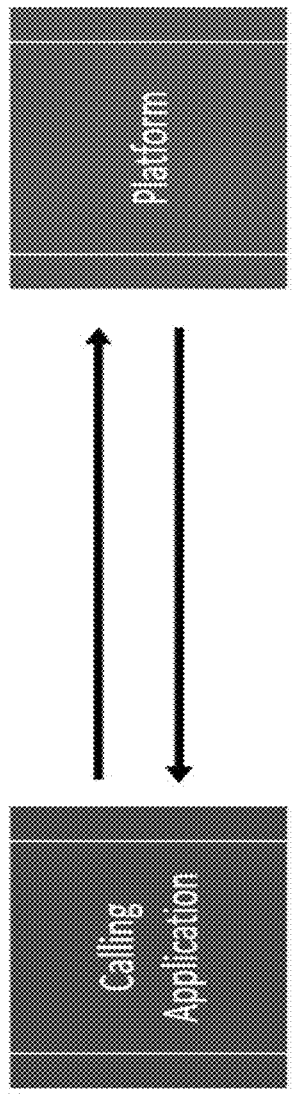
FIG. 16 illustrates profiles in use for Interface Definitions in accordance with an embodiment of the invention.

Finally, in many embodiments, the SM Platform may retain the Profile Compound Class (the assembly of all Profile extensions) as a link from each instance. This feature of the Platform can provide an Interface Definition for each Object, so that external code can determine the Type (and sub-Types) for any requested Object. Any API call to the SM Platform for data can have a parallel call that returns the Interface Definition in the form of the assembled Profile. FIG. 16 illustrates profiles in use for interface definitions in accordance with an embodiment of the invention.

In many embodiments, this may allow Integrated Applications, the third Profile Interpreter, to match any Object to whatever capabilities it knows about—regardless of the polymorphic nature of the Platform's data model. As an example, a dashboarding application may know how to render a status display for any Extruder that derives from the afore-mentioned industry modeling exercise. When this application requests a payload of objects from the SM Platform, the resulting Instances will likely have been extended (morphed) into a new Compound Class which has changed the structure and data of the Instance far beyond what the Interpreting application has any knowledge of. However, since the Interpreting application is also provided with the assembled Profile, as an Interface Definition, it can still walk the interface to find the subset of data it knows how to render. This interface reflection can be utilized by any integrating application or tool, including Workflow, Data Science and AI algorithms, or other member capabilities.

Polymorphism Through Graph Relationships

In many embodiments, Polymorphism may not be restricted to the core SM Platform or SM Edge Interpreters, however. Applications that Interpret the Instance objects may also extend them on-the-fly as well. In many embodiments, an Application that finds Objects it understands may also pass back to the SM Platform an extension Profile, and corresponding data. Rather than directly morphing the live object instance, this licensed transaction may cause a new Object to be created in the SM Platform Context graph, of the Type specified by the extension Profile, and a new graph relationship link to be established between the original object instance, and the new extension object instance—a foreign key linking external data to the data stored in the Platform. This "loose coupling" may allow a user/member to contribute their capabilities to the Platform, without needing to inject them into the data ingestion end of stack. Other applications can follow links in the Context Graph, read the Interface definition, and match or use capabilities of otherwise unintegrated applications, in a data-centric approach to a horizontally scaled architecture.

Although specific implementations for a data centric smart manufacturing system are discussed above with respect to FIGS. 1-16, any of a variety of implementations utilizing the above discussed techniques can be utilized for a data centric smart manufacturing system in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A data centric smart manufacturing system, comprising:
a plurality of machine systems each configured to provide raw data while performing a manufacturing process that applies transformations to raw inputs to produce a finished product using real time operations data, the systems having controllable operating parameters;
a plurality of reusable data model profiles as declarative templates that can be instantiated to ingest the raw data and contextualize the raw data, wherein a data model profile defines contextualized data as operating inputs and measured outputs, model configurations, controllable operating parameters, and data connectivity protocols for a particular type of machine system from the plurality of machine systems; and a plurality of data transformation models integrated with the plurality of data model profiles and instantiated with contextualized data to provide higher level operational insights;

wherein at least one data model profile is a base data model profile;

wherein at least one data model profile is an extended data model profile that inherits the base data model profile and extends the base data model profile to define how to populate data points of the base data model profile from sensor data of environmental conditions output by an associated machine system of the plurality of machine systems and estimate data points of environmental conditions for locations within the associated machine system where sensor data was not collected;

wherein at least one data model profile is a model orchestration activity profile that calls at least one of the plurality of data transformation models to perform a computation against data identified and gathered as the base data model profile and the extended data model profile are executed, and where the computation is used to determine controllable operating parameters for one or more of the machine systems from the data points of the base data model profile including the estimated data points; and another one of the plurality of data transformation models determines at least one optimal location within one of the machine systems for collection of sensor data to accurately measure an environmental condition and an optimal frequency of the data collection.

2. The data centric smart manufacturing system of claim 1, wherein a system is at least one of a sensor, a robot, a device, a component, a machine, a collection of machines, and a manufacturing plant.

3. The data centric smart manufacturing system of claim 1, wherein a data model profile is extended upon to define transformations to the raw data generated by the plurality of systems to create specific input data to a data store.

4. The data centric smart manufacturing system of claim 3, wherein the data store is accessible to at least one application;

wherein the at least one application generates configuration parameters to control the operation of a particular system based upon data obtained across a set of systems utilized within a manufacturing process.

5. The data centric smart manufacturing system of claim 4, wherein the at least one application analyzes different data obtained from a plurality of different systems manufactured by different vendors.

6. The data centric smart manufacturing system of claim 4, wherein the at least one application uses a data model profile to obtain data from at least one system.

7. The data centric smart manufacturing system of claim 4, wherein the at least one application uses a plurality of data model profiles to access data from a plurality of different systems.

8. The data centric smart manufacturing system of claim 3, wherein the data store stores the raw data as contextualized XML data.

9. The data centric smart manufacturing system of claim 1, wherein a data model profile is defined for at least one of a sensor, a device, and a system.

10. The data centric smart manufacturing system of claim 1, wherein a data model profile is defined for a particular vendor.

11. The data centric smart manufacturing system of claim 10, wherein a first data model profile is defined for a first vendor and a second data model profile is defined for a second different vendor.

12. The data centric smart manufacturing system of claim 11, wherein a third data model profile is defined that inherits properties from the first data model profile and the second data model profile.

13. The data centric smart manufacturing system of claim 1, wherein a first data model profile comprises a first set of attributes and a first set of functions for a system.

14. The data centric smart manufacturing system of claim 13, wherein a second data model profile inherits the first set of attributes and the first set of functions from the first data model profile and comprises a second set of attributes and a second set of functions.

15. The data centric smart manufacturing system of claim 1, wherein different data model profiles are defined for different vendors.

16. The data centric smart manufacturing system of claim 1, wherein at least one data model profile comprises a plurality of data ingestion protocols for ingesting raw data from a plurality of different vendor systems.

17. The data centric smart manufacturing system of claim 1, wherein the plurality of systems are from different vendors.

18. The data centric smart manufacturing system of claim 1, wherein a data model profile defines a vendor-agnostic set of attributes and a set of functions for a system.

19. The data centric smart manufacturing system of claim 1, wherein a system data model profile is defined for a plurality of devices.

* * * * *